(12) United States Patent
Moon et al.

(10) Patent No.: US 8,315,636 B2
(45) Date of Patent: Nov. 20, 2012

(54) TECHNIQUES FOR DISTRIBUTING DATA AMONG NODES BASED ON DYNAMIC SPATIAL/ORGANIZATIONAL STATE OF A MOBILE NODE

(75) Inventors: Billy Moon, Cary, NC (US); James Miner, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 1340 days.

(21) Appl. No.: 11/065,021

(22) Filed: Feb. 24, 2005

(65) Prior Publication Data

US 2006/0188327 A1   Aug. 24, 2006

(51) Int. Cl.
*H04W 40/00*   (2009.01)
*H04W 4/00*   (2009.01)

(52) U.S. Cl. .................................. 455/446; 370/338

(58) Field of Classification Search .................. 455/417, 455/414.1, 414.2, 445, 456.3, 446–449; 370/338; 709/201, 244, 206
See application file for complete search history.

(56) References Cited

U.S. PATENT DOCUMENTS

| | | | |
|---|---|---|---|
| 5,517,618 A | 5/1996 | Wada et al. | |
| 5,634,010 A | 5/1997 | Ciscon et al. | |
| 5,941,955 A * | 8/1999 | Wilby et al. | 709/242 |
| 6,172,986 B1 | 1/2001 | Watanuki et al. | |
| 6,327,594 B1 | 12/2001 | Van Huben et al. | |
| 6,377,793 B1 | 4/2002 | Jenkins | |
| 6,480,713 B2 | 11/2002 | Jenkins | |
| 6,490,460 B1 | 12/2002 | Soliman | |
| 6,542,925 B2 | 4/2003 | Brown et al. | |
| 6,587,882 B1 | 7/2003 | Inoue et al. | |
| 6,665,677 B1 * | 12/2003 | Wotring et al. | 707/100 |
| 6,681,107 B2 | 1/2004 | Jenkins | |

(Continued)

FOREIGN PATENT DOCUMENTS

EP   1 168 715 A2   1/2002

(Continued)

OTHER PUBLICATIONS

Johnson et al., "Mobility Support in IPv6", draft-ietf-mobileip-ipv6-24.txt, Internet Draft, IETF Mobile IP Working Group, [online], Jun. 30, 2003, [retrieved on Aug. 2, 2007]. Retrieved from the Internet: <URL: http://www.ietf.org/internetdrafts/draft-ietf-mobileip-ipv6-24.txt>, pp. 1-172.

(Continued)

*Primary Examiner* — Melody Mehrpour
*Assistant Examiner* — Emem Stephen
(74) *Attorney, Agent, or Firm* — Leon R. Turkevich

(57) ABSTRACT

Techniques for managing data in a distributed system include receiving first mobile data that includes non-routing data for a mobile node of multiple nodes in a distributed data system. The mobile node is associated with a first data item of multiple data items in the distributed data system. Non-routing data includes organizational data for data items in the distributed database or spatial data, or both. Spatial data includes at least one of a physical location, shape, size, and orientation. A non-topological relationship is determined between the first data item and a different second data item based on the non-routing data. Content is communicated with the mobile node based at least in part on the non-topological relationship. These techniques allow conservation of valuable network resources by communicating only data relevant to a recipient based on the spatial or organizational context of the communicating nodes.

55 Claims, 6 Drawing Sheets

U.S. PATENT DOCUMENTS

| | | | |
|---|---|---|---|
| 6,748,233 B1 | 6/2004 | Arnold et al. | |
| 6,763,013 B2 | 7/2004 | Kennedy | |
| 6,763,014 B2 | 7/2004 | Kennedy | |
| 6,763,369 B1* | 7/2004 | Ytuarte et al. | 709/201 |
| 6,765,892 B1 | 7/2004 | Leung et al. | |
| 7,085,576 B2 | 8/2006 | Ranganathan | |
| 7,363,024 B2 | 4/2008 | Jenkins | |
| 7,519,733 B1 | 4/2009 | Thubert et al. | |
| 7,549,145 B2 | 6/2009 | Aguilar et al. | |
| 7,664,119 B2* | 2/2010 | Adams et al. | 370/400 |
| 7,733,882 B2* | 6/2010 | Furukawa et al. | 370/400 |
| 2003/0129995 A1 | 7/2003 | Niwa et al. | |
| 2004/0014567 A1 | 1/2004 | Mendel | |
| 2004/0024886 A1* | 2/2004 | Saxena | 709/229 |
| 2004/0030571 A1 | 2/2004 | Solomon | |
| 2004/0057409 A1 | 3/2004 | Kennedy | |
| 2004/0134336 A1 | 7/2004 | Solomon | |
| 2004/0139049 A1* | 7/2004 | Hancock et al. | 707/1 |
| 2004/0192352 A1 | 9/2004 | Vallstrom et al. | |
| 2005/0060364 A1 | 3/2005 | Kushwaha et al. | |
| 2005/0068169 A1 | 3/2005 | Copley et al. | |
| 2005/0076054 A1 | 4/2005 | Moon et al. | |
| 2005/0106941 A1 | 5/2005 | Witchey | |
| 2005/0171876 A1* | 8/2005 | Golden | 705/30 |
| 2006/0025154 A1 | 2/2006 | Alapuranen et al. | |
| 2007/0086425 A1 | 4/2007 | Leow et al. | |

FOREIGN PATENT DOCUMENTS

| | | |
|---|---|---|
| EP | 1 351 174 A1 | 10/2003 |
| GB | 2 375 006 A | 10/2002 |

OTHER PUBLICATIONS

Object Management Group, "OMG Unified Modeling Language Specification", Version 1.5, Mar. 2003, [online], [retrieved on Sep. 20, 2003]. Retrieved from the Internet: <URL: http://www.omg.org/docs/formal/03-03-01.pdf>, pp. 1-736.

Burden, "Routing the Internet", [online], Jan. 17, 1999, [retrieved Apr. 11, 2006]. Retrieved from the Internet: <URL: www.scit.wlv.ac.uk/jphb/comms/iproute.html>, pp. 1-8.

Sibley et al., "Robomote: A Tiny Robot Platform for large-Scale Ad-Hoc Sensor Networks", May 2002, Proceedings of the 2002 IEEE International Conference on Robotics and Automation, pp. 1143-1148.

Affens, NASA, "Emergency Beacon Development", Feb. 28, 2006, [online], [retrieved on Nov. 4, 2009]. Retrieved from the Internet: <URL: http://www.archive.org/web/20060623055831/http://searcjandrescue.gsfc.nasa.gov/techdevelopment/beacons.htm>, pp. 1-2.

Day et al., "A Model for Presence and Instant Messaging", RFC 2778, IETF Network Working Group, [online],Feb. 2000, [retrieved on Nov. 12, 2009]. Retrieved from the Internet: <URL: http://tools.ietf.org/pdf/rfc2778.pdf>, pp. 1-17.

* cited by examiner

TECHNIQUES FOR DISTRIBUTING DATA AMONG NODES BASED ON DYNAMIC SPATIAL/ORGANIZATIONAL STATE OF A MOBILE NODE

BACKGROUND OF THE INVENTION

1. Field of the Invention

The present invention relates to using dynamic location or organizational data to determine how to distribute data among nodes.

2. Description of the Related Art

Networks of general-purpose computer systems connected by external communication links are well known and widely used in commerce. The networks often include one or more network devices that facilitate the passage of information between the computer systems. A network node is a network device or computer system connected by the communication links. An "end node" is a node that is configured to originate or terminate communications over the network. An "intermediate network node" facilitates the passage of data between end nodes.

Communications between nodes are typically effected by exchanging discrete packets of data. Information is exchanged within data packets according to one or more of many well known, new or still developing protocols. In this context, a protocol consists of a set of rules defining how the nodes interact with each other based on information sent over the communication links. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different layer of detail for information exchange. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

The data-link header provides information defining a particular communication link between one network node and an adjacent node. The internetwork header provides information defining the source and destination address within the computer network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header. After each hop, the source or destination addresses in the packet's data-link header may be updated, as necessary. However, the source and destination IP addresses typically remain unchanged as the packet is transferred from link to link in the network.

Routers and switches are network devices that determine which communication link or links to employ to support the progress of data packets through the network. A network node that determines which links to employ based on information in the internetwork header (layer 3) is called a router. Some protocols pass protocol-related information among two or more network nodes in special control packets that are communicated separately and which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications.

A link-state protocol is an example of a "routing protocol," which only exchanges control plane messages used for routing data packets sent in a different "routed protocol" (e.g., IP). A link-state method floods routing information to all nodes on the internetwork in a link-state protocol control plane data packet; however, each router sends only the portion of the routing information that describes the state of its own links. Link-state data indicates direct links between a network node that performs routing functions (a router) and a different router (e.g., links on the same network segment, which do not involve a third router). The link-state data also indicates other characteristics of those links, such as bandwidth and congestion. According to link-state methods, each router builds a topology model of the connections in the entire network in its routing tables based on the link-state data received from other routers in the same. Routing decisions are based on the topology model of connections throughout the network.

User data includes other data routed between end nodes on a network. Digital files and databases of user data at end nodes are well known and widely used. Distributed systems of user data take advantage of the multiplicity of nodes in a network to distribute storage, processing and communication loads among different end nodes. Distributed systems are well known and widely used on various networks. For example, the World Wide Web distributes files of user data, called pages, over multiple end nodes on the public Internet. Many distributed systems, including the World Wide Web, electronic mail (e-mail) and file transfer protocol (FTP), are built on the client-server model for interaction among multiple processes executing on one or more nodes.

Some distributed systems do not relay on a client request and server response, but instead automatically send information to certain nodes without waiting for a request. An example of such a distributed system is a broadcast or subscription service. These systems are similar to radio and television broadcasts or newspaper home delivery. A subscriber signs up for the service and then a publisher/broadcaster sends information at times determined by the publisher/broadcaster, such as when the publisher/broadcaster produces the data. For example, the Really Simple Syndication (RSS) service (also known as the Rich Site Summary) sends new web page content to subscribers when a particular World Wide Web page changes. RSS uses a particular format so the information can be inserted in an existing copy of a World Wide Web page stored on the subscriber's node. Whereas the client-server model is a "pull" of information, the subscription services provide a "push" of information.

In emerging network systems, network nodes, both intermediate network nodes and end nodes, are not fixed assets in a building or campus, but, instead, include mobile network nodes that are deployed as moving assets on mobile users, such as persons, animals, robots, vehicles and earth-orbiting satellites. In such systems, topology models of current communication links are not sufficient to make decisions on how and where to route information managed by the network. Information on the spatial arrangement of nodes and users of those nodes becomes important, and may even affect the routes taken to distribute data. It is often desirable that the data pulled by a client or pushed by a publisher depend on the spatial relationship between the user of the mobile node and other users, nodes or data items in the distributed system.

For example, mobile ad hoc networks (MANets) involve mobile wireless routers that network with other fixed or mobile wireless routers with which they come into transmission range. The mobile routers can be carried by humans, animals or vehicles, including robots and earth-orbiting satellites, to interface multiple electronic devices also carried. MANets have applications in tactical police and military and emergency medical services scenarios, including Search and Rescue and other responses to environment-damaging accidents, terrorist attacks and natural disasters, among others. The mobile routers feed information to various control interfaces for the vehicles or various display elements for a human user or stimuli for animals. The routers also receive and transmit to the network information from various sensors or input devices operated by the user, such as the person, an animal or the vehicle. The MANets allow different units to share more information more quickly so that the multiple units can proceed as a coordinated whole. Many network nodes have position information available, such as a location from the Global Positioning System (GPS) widely known and used in commerce, or location from a local triangulation system using three or more electromagnetic wave beacons or acoustic beacons.

In an example scenario, a rescue worker must proceed into a multi-chambered cave to search for a missing human victim. The worker is transported with multiple robots to the site by a large vehicle. The large vehicle has a wide area network connection to a data center with a geographic information system (GIS) that include a map of the cavern chambers. The robots carry end nodes and wireless routers and the end nodes are programmed to operate the robots in order to maintain MANet connectivity between the vehicle and the worker as the worker winds through the cavern.

At first all the robots and the worker are in an overlapping area of wireless coverage. Full network connectivity and adjacency among all robots and the worker consumes network resources, is temporary and is unneeded. Instead, it is preferable that the robots form a line from the large vehicle to the worker based on spatial positions of the large vehicle and the worker. The topographic adjacency of each wireless router is then only established between the spatially preceding and spatially following robots. Thus routing information depends on location information.

As the worker moves into the cavern, the robots increase their separation based on the spatial information to maintain wireless MANet communications in series from the worker to the large vehicle. Thus, information communicated to the intermediate node for the user is preferably based on location data. If necessary, one or more routers are reconfigured to use increased power to keep a router on an adjacent robot in range. Thus, intermediate node configuration is preferably based on location data.

The information the worker wants communicated over this robot-assisted network from the GIS depends on where the worker is located. If the location of the worker and the worker's heading (orientation) is communicated by the worker's end node to a GIS client, then it is preferable that the GIS client somewhere on the network request from the GIS what is ahead of the worker. Thus the non-routing information to be communicated over the network is preferably based on worker location and heading data.

Other spatial information, such as size and shape, is also useful in communicating data over a network. For example, if the large vehicle is bigger than the cave mouth, then it is not desirable to position the large vehicle in the cave entrance to support network communications with the worker. A desirable proximity of the location of the center of mass of the large vehicle to the position of the center of the cave mouth depends on the size and shape of the large vehicle and the size and the shape of the cave mouth.

As another example, it is noted that many buildings are currently equipped with multiple access points for wireless network communication links. If a mobile node using the access point requests information about the building, the response is preferably based on the user's location and not the location of the access point. For example, if the user is located on a floor above the access point, a request for a restroom or fire extinguisher location is better answered with directions to a restroom or fire extinguisher on the same floor as the user and not with directions to a restroom or fire extinguisher on the same floor as the access point.

In some approaches, location data available from a network node is used to select and configure a network node by changing, for example the power and frequency used for one or more wireless communication links. See, for example, H. Arnold et al., U.S. Pat. No. 6,748,233, Jun. 8, 2004 and R. Kennedy, U.S. Pat. Nos. 6,763,013, and 6,763,014, Jul. 13, 2004. Time series of location data is used to predict present and future advantageous nodes and configurations to maintain connectivity.

In another approach, vehicles carrying mobile nodes are moved to establish or preserve node adjacencies that support desirable routing. See Billy Moon et al., "Arrangement For Autonomous Mobile Network Nodes To Organize A Wireless Mobile Network Based On Detected Physical And Logical Changes," U.S. Patent Application Ser. No. 10/679,312, filed on Oct. 7, 2003 and published Apr. 7, 2005 as U.S. Patent Publication No. 2005/0076054.

Unfortunately, these dynamic network systems do not take advantage of spatial information available from mobile nodes to select the non-routing data to be delivered over the wireless communication link. As used here, spatial information includes physical location information or physical shape information or physical size information or physical orientation information, or some combination. Thus, in the examples given above, the dynamic network system approaches described do not automatically send the appropriate cave information to the rescue worker or provide the data of the correct building floor to the office worker.

Based on the foregoing, there is a clear need for techniques to determine data to be communicated with a mobile node based on a dynamic spatial state of the mobile node.

The approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus are described for distributing data based on a spatial or organizational state associated with a mobile node. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

For purposes of illustration, embodiments of the invention are described in the context of a MANet used by a rescue force, but the invention is not limited to this context. In other contexts, other networks, including stationary wireless access points for mobile nodes and cellular telephone networks, apply techniques of the present invention to support the same or different services.

1. Structural Overview

Figure 1:
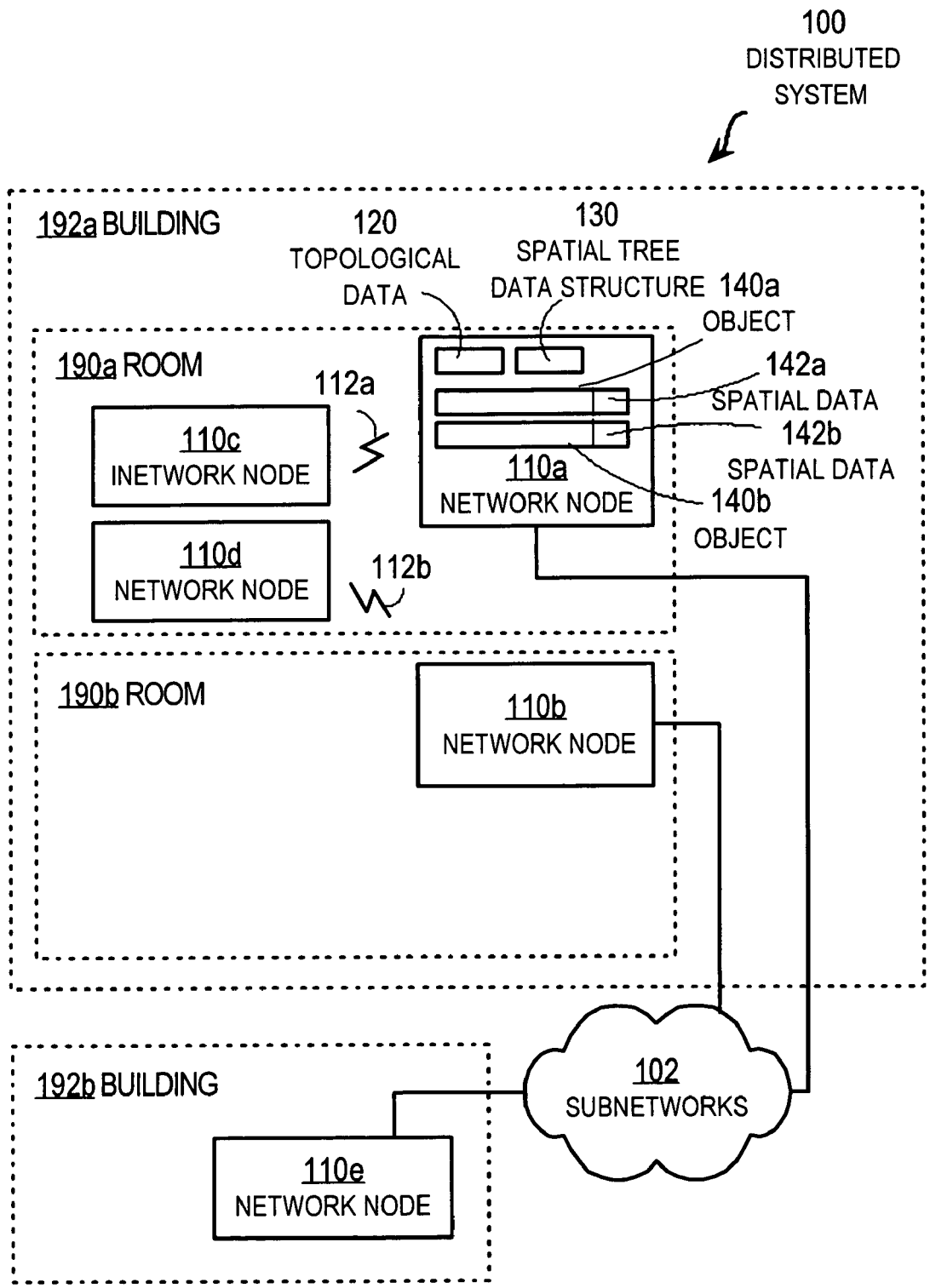
FIG. 1 is a block diagram that illustrates a distributed system of data items as objects on multiple nodes, according to an embodiment.

FIG. 1 is a block diagram that illustrates a distributed system 100 of data items as objects on multiple nodes, according to an embodiment. The system 100 includes one or more subnetworks 102, connected to one or more network nodes (e.g., network nodes 110a, 110b, 110c, 110d, 110e, collectively referenced hereinafter as network nodes 110). The network nodes 110 include both intermediate network nodes, e.g., network nodes 110a, 110b and wireless, mobile end nodes, e.g., nodes 110c, 110d. The system 100 includes multiple data items, such as data objects 140a, 140b (collectively referenced hereinafter as data objects 140) in an object oriented system. The system 100 also includes topological data 120 and a spatial tree data structure 130.

The subnetworks 102 include any network that connects network nodes, including, but not limited to, local area networks (LANs), wireless networks, wide-area networks (WAN), the Internet (a network of heterogeneous networks using the Internet Protocol, IP), and virtual private networks. For the purposes of illustration, five network nodes 110 are shown connected to subnetworks 102 in FIG. 1. In other embodiments more or fewer network nodes are included in system 100.

For purposes of illustration, mobile end node 110c is carried by a first user and communicates by a wireless link 112a with intermediate network node 110a which serves as a building access point. For example, the first user carries a laptop computer with a wireless network interface card as end node 110c. As another example, the first user carries a cellular telephone that has a wireless link with a cellular tower that connects to an intermediate cellular network node 110a.

Also for purposes of illustration, mobile intermediate network node 110d is carried by a second user and communicates by a wireless link 112b with intermediate network node 110b which serves as a second wireless access point. Mobile intermediate network node 110d is also connected to network segments (not shown) carried by the second user. A network segment is a portion of a network that does not include an intermediate network node. Network segments connect mobile intermediate network node 110d to mobile end nodes (not shown) that are also carried by the second user. For example, a rescue worker carries a personal router as intermediate network node 110d connected by one or more network segments to a wearable computer, a digital camera, a controller for an ear-piece and heads-up display, and a global positioning system (GPS) as the end nodes (not shown). In other embodiments, more or fewer users carry more or fewer network nodes.

For purposes of illustration, it is assumed that node 110a, and users carrying nodes 110c, 110d are in room 190a of building 192a. It is further assumed that node 110b is in room 190b, directly below room 190a in building 192a. It is further assumed that node 110e is in building 192b on the same campus.

According to embodiments of the invention, non-routing data in the distributed system 100 is communicated with a mobile node, e.g., node 110d, based on spatial data related to the spatial state of that node.

Data in the distributed system 100 is stored in multiple data objects, e.g., data objects 140a, 140b on node 110a. Data objects are well known and widely used in object oriented systems. A data object is a collection of data that represents one or more attributes and methods for operating on those attributes. See for example, Scott W. Ambler, *The Object Primer: The Application Developer's guide to Object-orientation*, University of Cambridge Press, Cambridge, United Kingdom, 248 pp, 1998, the entire contents of which are hereby incorporated by reference as if fully set forth herein. Objects are often formed as instances of a class of objects that share certain characteristics, such as the types and names for the attributes and the actual methods for operating on those. For example, an object representing a person such as the first user is formed by giving particular values to attributes of persons defined in a class of persons. The individual objects differ in the values stored for one or more attributes. Classes in turn can share attributes and methods with different classes. For example, some attributes of persons are also attributes of equipment, such as being under the authority of a particular manager. Classes are typically related in a hierarchy, in which classes lower in the hierarchy inherit attribute types and methods from classes at higher levels in the hierarchy. In other embodiments, data is stored in structures that are different from data objects, such as in flat files of data or in relational databases.

Although only two data objects 140a, 140b are shown in FIG. 1 for purposes of illustration, in other embodiments more or fewer data objects are included on each of two or more nodes of distributed system 100.

Data objects, such as objects 140a, 140b, store information about any entity that is a subject of the distributed data system 100, including physical, logical, abstract, and imaginary entities. Some objects represent physical entities, such as network nodes 110, other equipment, structures, geographic regions, and one or more persons, by storing values of attributes and methods appropriate for describing those physical entities. In the illustrated embodiment, objects 140a, 140b include spatial data 142a, 142b, respectively, that indicate values for spatial attributes in a class of objects.

The connections between nodes 110 and subnetworks 102 are represented as topological data in the distributed system. For example, routing tables maintained by multiple routers in a network constitute distributed network topological data. At least some topological data, e.g., topological data 120 on node 110a, is stored at multiple nodes in the distributed system.

The spatial relationships of physical entities are represented as a spatial tree. At least some spatial relationships are stored at multiple nodes in the distributed system, such as spatial tree data structure 130 on node 110a.

2. Multiple Hierarchies of Data Objects

In the illustrated embodiment, most objects are instances of a super class World. The World super class specifies a minimum number and type of attributes and methods that each world object includes. The World class includes an attribute that indicates a number of attributes, methods for setting and getting values of the attributes, and methods for identifying the parent or child of an object. The World class allows one or more attributes to be other world objects.

In the illustrated embodiment, the World class includes one attribute, called "Shape," that is an object of a Shape sub-class of a Collections class. A Collections class includes multiple attributes (n-tuples) and methods for setting and getting those attributes. The Shape sub-class includes an n-tuple of attributes used to describe a collection of one or more polyhedrons, which are prescribed three-dimensional shapes, and methods for comparing two or more n-tuples.

In the illustrated embodiment, the World class also includes one attribute, called "Way-Point," that is a world object of a Way-point sub-class. The Way-point sub-class includes an n-tuple of attributes used to specify a reference frame and coordinates of a location. In this embodiment, the World class also includes one or more transformation methods for converting the coordinates between different reference frames of world objects that are attributes of (owned by) an object instantiated from the World class. In some embodiments, the Way-point sub-class n-tuple includes attributes that indicate orientation. A way-point object instantiated from the Way-point sub-class is a kind of world object that represents a "place" attribute in the world. As used herein, the term "way-point" is not limited to geographic way-points, such as Geodesic coordinates used by GPS systems, but also may specify a location of an object in arbitrary vector space. For example, in some embodiments the object represents a physical entity, such as a host computer or a certain router, and the way-point attributes represent a position in terms of number of hops ("hop count") from a reference network node. In another example embodiment, the way-point attributes represent a signal strength in deciBels (dB) relative to a reference signal strength for a radio frequency (RF) transmitter or receiver on a wireless network node. Since a way-point object is a world object, it has a Shape attribute, since all world objects own a shape from a container of predefined shape objects. Unlike more general objects of the World class, way-point objects do not own world objects (i.e., they do not include attributes that are world objects); hence a world object cannot be added as an attribute into a way-point object.

In the illustrated embodiment, there is a Brain class of objects. The Brain class includes an n-tuple of attributes used to describe a collection of one or more reactions, which themselves are objects of a Reaction class. A world object that owns an object of the Brain sub-class is called a "smart world object," or simply a "smart object." The Brain class includes methods to combine values from one or more reactions to produce a value for an attribute called behavior. The Reaction class includes methods to determine a reaction value based on the values of attributes of one or more other world objects, such as world objects that represent sensors.

As used herein, the "Infosphere" is the collection of world objects generated from the World super-class for describing a particular operational scenario. The Infosphere is distributed over multiple nodes of the distributed system 100 and describes the environment and operation of those multiple nodes and the users of the distributed system 100. In the illustrated embodiments, the particular operational scenario includes multiple network nodes of the distributed system itself deployed in a geographical area to support operations of one or more organizations. Thus the Infosphere includes world objects that describe all the network nodes of the distributed system, all the geographical locations of interest, and all the elements of the one or more organization. The different components are organized into multiple hierarchies that can each be represented by a tree data structure. Thus, the example operational scenario is organized into one hierarchy that describes the network node connectivity, another hierarchy of geographic entities, and another hierarchy for each organization involved, such as a government, a government agency, an army, a rescue force, an emergency response force, among others. In some embodiments, the organizational hierarchy describes social infrastructure, such as a power grid, a water and sewer system, a rail system, and a highway system, among others.

In the illustrated embodiment, the Infosphere is represented by a Root World object. The Root World object includes, as values of its attributes, pointers to root objects for the different hierarchies of the Infosphere, e.g., root objects for the network nodes, the geographic area and the one or more organizations interacting in the operational scenario A spatial hierarchy relates its objects based on a spatial relationship. For example, in the illustrated embodiment, the relationship is that one object in the hierarchy is inside a different object of the hierarchy. For example an object representing a building is inside of an object that represents the building's city. This relationship is called hereinafter the INSIDE-A relationship. This spatial relationship is different from a network topological relationship. In other embodiments, the spatial relationship represented by the hierarchy is different from the INSIDE-A relationship. For example, in other embodiments a spatial relationship indicates one object is in front of (or behind) or in a particular direction from another object; or indicates an object is bigger than (or smaller than) another object; or indicates one object has more polyhedron vertices than another object; or indicates one object is in transmission range for a particular type of communication with or is visible to another object, or indicates one object is a particular distance from or overlaps another object, or indicates other spatial relationships.

An organizational hierarchy relates its objects based on an organizational relationship. For example, in the illustrated embodiment, the relationship is that one object in the hierarchy is a component of a different object of the hierarchy. For example an object representing a particular trooper is a component of an object that represents the trooper's platoon. This relationship is called hereinafter the IS-A relationship. This organizational relationship is different from a network topological relationship or a spatial relationship. In other embodiments, the organizational relationship represented by the hierarchy is different from the IS-A relationship.

A network hierarchy relates its objects based on a network connection relationship. For example, in the illustrated embodiment, the relationship is that one object in the hierarchy is connected to a different object of the hierarchy. For example an object representing a particular network node on a subnetwork is connected to an object that represents the subnetwork. This relationship is called hereinafter the CONNECTED-TO relationship. In other embodiments, the network topology relationship represented by the hierarchy is different from the CONNECTED-TO relationship.

Figure 2:
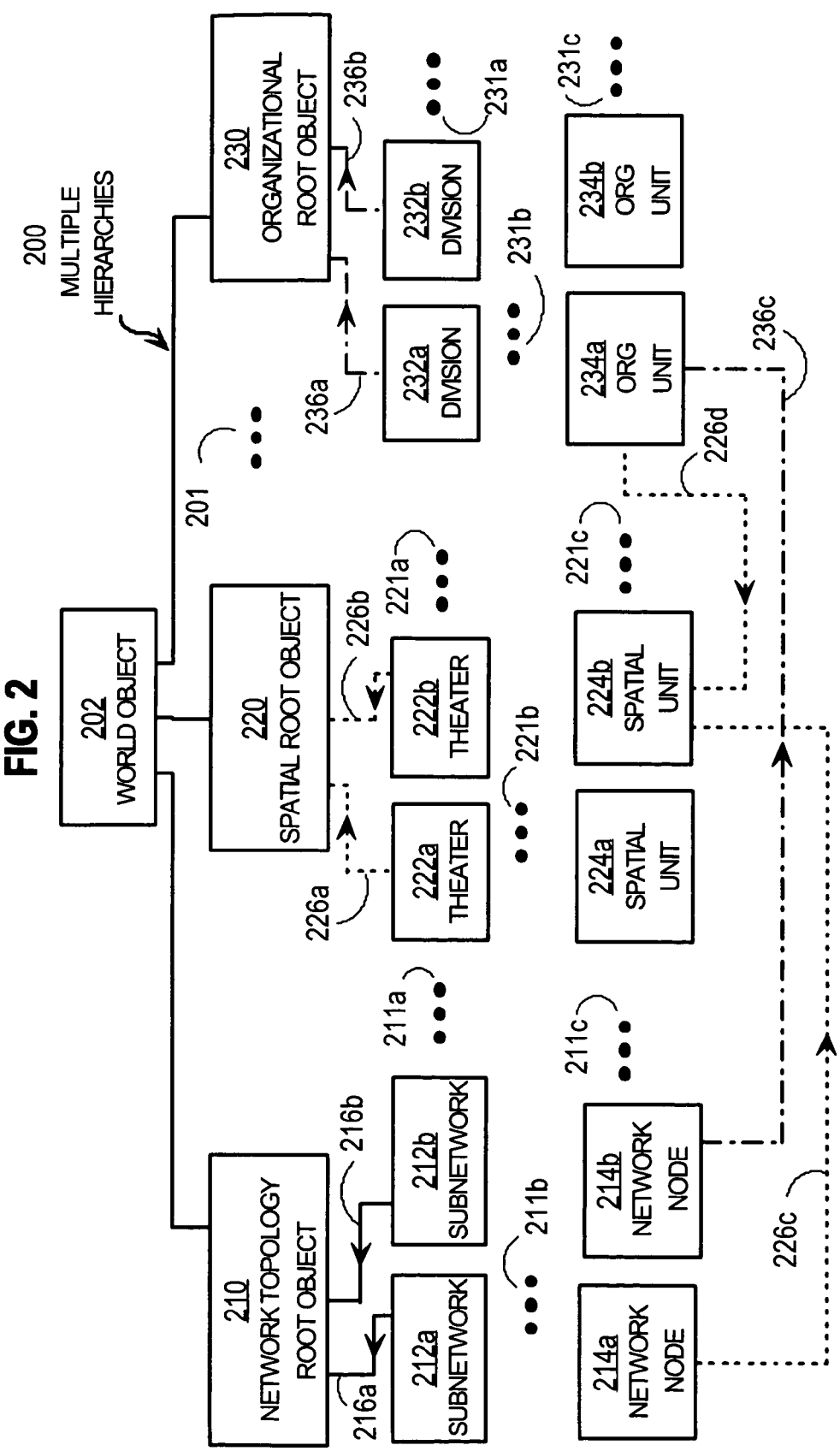
FIG. 2 is a block diagram that illustrates multiple hierarchies that relate objects in the distributed system, according to an embodiment.

FIG. 2 is a block diagram that illustrates multiple hierarchies 200 that relate objects in the Infosphere, according to an embodiment. In each hierarchy below a root level, an object has a relationship with one parent object at a level above from which the object may inherit values of one or more attributes. One object may have at a level below any number of children objects that have the same relationship to the object. At least three hierarchies are represented: a network topology hierarchy descending from a network topology root object 210; a spatial hierarchy descending from a spatial root object 220; and an organizational hierarchy descending from an organizational root object 220. In other embodiments, other hierarchies are included as indicated by the ellipsis 201. For example, if organization root object 230 represents the commander of an army, other organizational root objects are used to represent the commander of a rescue force, or the commander of a police force, or the head of a political organization, or an infrastructure system, such as a power grid, a water and sewage system, and a road system, among others.

The multiple hierarchies are joined by having the same parent object, the Root World object 202.

Each object in the hierarchy has a particular type of relationship with a parent object. For example, subnetwork objects 212a, 212b and others indicated by ellipsis 211a have CONNECTED-TO relationships with a network topology root object 210, as represented by the solid line arrows 216a, 216b. Similarly, theater objects 222a, 222b and others indicated by ellipsis 221a have INSIDE-A relationships with a spatial root object 220, as represented by the dotted line arrows 226a, 226b. Similarly, division objects 232a, 232b and others indicated by ellipsis 231a have IS-A relationships with organizational root object 230, as represented by the dashed-dotted line arrows 236a, 236b. The hierarchies continue through one or more levels, as represented by ellipses 211b, 221b, 231b. The hierarchies end at atomic objects that are not further subdivided and that may appear at any level in the hierarchy. For example, the network topology hierarchy ends at objects 214a, 214b and others indicated by ellipsis 211c that represent individual network nodes. Similarly, the spatial hierarchy ends at objects 224a, 224b and others indicated by ellipsis 221c that represent the finest grained spatial units, such as a cubic mile or a cubic meter of earth or air at a given location, or a room in a building. Similarly, the organizational hierarchy ends at objects 234a, 234b and others indicated by ellipsis 231c that represent the finest grained organizational units, such as a rescue worker in a rescue organization, or a power circuit in a power system.

Each hierarchy of the different hierarchies corresponding to the different relationships is represented in the distributed database system 100 by a tree data structure. A tree data structure provides a more efficient way to represent hierarchical relationships among objects than does a graph data structure. One tree data structure represents the relationships between the World root object 202 and the three or more root objects 210, 220, 230 and others indicated by ellipsis 201. Three or more separate tree data structures represent the trees descending from the root objects 210, 220, 230 or other root structures indicated by the ellipsis 201. In some embodiments, each hierarchy representing one type of relationship maintained in a tree structure is called a "flavor" of hierarchy, or simply, a flavor and the associated relationship is called a relationship flavor.

Typically, the tree data structures include only data that points to where the objects can be retrieved, such as a memory location or a universal resource location (URL) address, not the objects themselves. In some embodiments, one or more objects are included in the tree data structures.

In the illustrated embodiment, objects in one hierarchy are allowed to form relationships with objects in another hierarchy. Such objects (or data pointing to such objects) then appear in trees for more than one hierarchy.

For example, object 214a representing a wireless access point (e.g., network node 110a) is allowed to form an INSIDE-A relationship 226c with a spatial object, such as object 224b representing a room, such as room 190a. Similarly, object 234a representing an individual rescue worker is allowed to form an INSIDE-A relationship 226d with a spatial object, such as object 224b representing room 190a. Object 214b representing a mobile node (e.g., network node 110d) worn by a rescue worker is allowed to form an IS-A relationship 236c with an organizational object, such as object 234a representing the rescue worker in room 190a.

Many of these relationships are dynamic. For example, as network node 214b moves, it breaks a CONNECTED-TO relationship with one node (e.g., represented by object 212a) and establishes a CONNECTED-TO relationship with another node (e.g., represented by object 214a). The relationships that cross hierarchies are expected to be especially dynamic. For example, as the rescue worker associated with object 234a moves through a city, the INSIDE-A relationship 226d is expected to change from one object of the spatial hierarchy to another, e.g. from object 224b representing room 190a to object 224a representing a different room in the same or different building (e.g., room 190b).

It is noted that world objects of a spatial flavor (e.g., room 190a) typically have a fixed shape and have a variable number of children determined by which objects are positioned within their shape. In contrast, world objects of an organizational flavor (e.g., a platoon object) typically have a fixed or slowly changing number of children (e.g., all rescue workers in the platoon), but have a variable shape as those children move around. The organizational object's shape varies to a polyhedron of the correct dimensions to encompass all of its children's shapes and locations.

Figure 3:
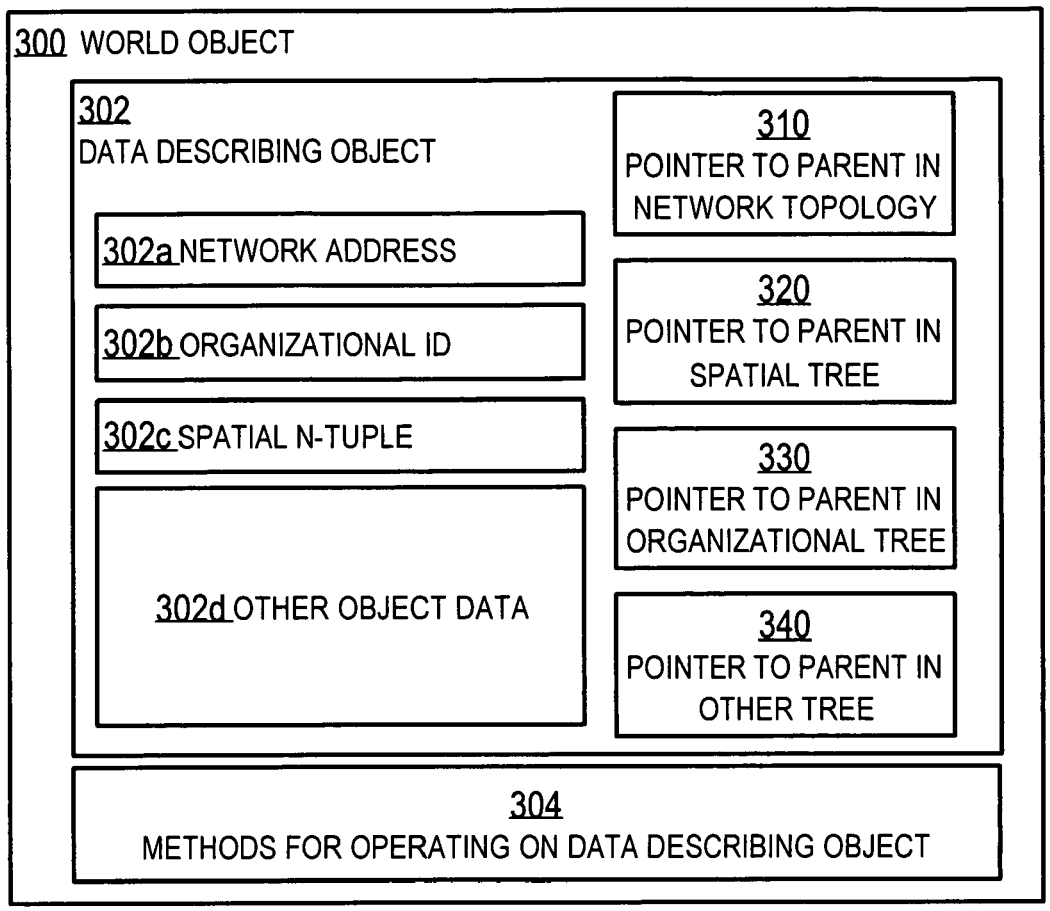
FIG. 3 is a block diagram that illustrates contents of an object, according to an embodiment.

FIG. 3 is a block diagram that illustrates contents of a world object 300, according to an embodiment. Each world object 300 includes attributes and methods as stated above. For example world object 300 includes data describing attributes 302 and data indicating methods 304. Typically the method data 304 stored in object 300 is a call to a routine for which the instructions are stored elsewhere, such as in a data structure describing a class or super-class for the object. In the embodiment illustrated in FIG. 3, the attributes hold data 302 describing the object, such as a network address 302a, an organizational identifier (ID) 302b, a spatial n-tuple 302c, and other object data 302d. Objects that do not describe network nodes do not include a network address 302a. Objects that are not part of an organization do not include an organization ID 302b. Objects that do not have spatial properties do not include the spatial n-tuple 302c.

The spatial n-tuple is any vector of one or more values that describe spatial properties of the object. For example, in one embodiment, the spatial n-tuple includes values for the following 11 attributes: one value that indicates a reference frame, 3 coordinates that indicate a position relative to an origin of the reference frame, three size factors, a pointer to a shape, and three coordinates indicating an orientation. In the illustrated embodiment, the reference frame and coordinates are contained in a way-point object and the spatial n-tuple 302c includes a pointer to the way-point object. Similarly, the shape is expressed in a shape object and the spatial n-tuple 302c includes a pointer to the shape object. The shape gives context for the size and orientation values in the spatial n-tuple 302c.

The other object data 302d includes values of attributes that describe a particular entity associated with the object 300. For example, in object 224b that represents room 190a, the other object data 302d includes data that indicates the type of light and power in the room, the number and position of windows in the room, the maximum classification level, the capacity of the room for persons, the color of the room walls, the resident for the room and the material currently stored in the room, among others. The attributes that describe a room are typically listed in a Room Class that is a particular sub-class of the World class. Some of this information is included as pointers to other objects. For example, the resident for the room is indicated by a pointer to another object that describes the resident. As stated above, a world object may include one or more other world objects; in such objects the other data 302d includes the pointers to the other world objects. For example, in a world object 300 representing a building, the other data 302d includes pointers to world objects owned by that building, such as world objects representing different floors or different rooms in the building. The non-spatial information in a world object, e.g., the other object data 302d, is sometimes called the "infomatics" of the Infosphere.

In some embodiments, data 302 includes pointers to parents in one or more hierarchies. Since each object has only one parent in a particular hierarchy (except the World Root object which has no parent), this is easily accomplished. In the illustrated embodiment, object 300 includes a pointer 310 to a parent in the network topology hierarchy; includes a pointer 320 to a parent in the spatial hierarchy; includes a pointer 330 to a parent in the first organizational hierarchy; and includes a pointer 340 to a parent in another hierarchy. These pointers constitute a portion of the tree data structures. In some embodiments, the pointers 310, 320, 330, 340 are values of attributes in an object of a Parents sub-class of the Collections class. In some embodiments, the pointers 310, 320, 330, 340 are omitted, and parent child relationships are maintained in separate tree structures, such as portions of tree structure for topological data and spatial data depicted as 120, 130, respectively, in FIG. 1. In some embodiments, data 302 includes pointers to children of the object in one or more hierarchies. An object may have any number of children of a particular hierarchy flavor, and therefore may have multiple pointers to children objects in the same flavor hierarchy. In some embodiments, the pointers to children are values of attributes in an object of a Children sub-class of the Collections class.

The methods 304 include methods to perform spatial operations on two or more objects owned by the world object 300 as indicated in data 302. In some embodiments, methods 304 include methods to accept a spatial n-tuple of a second object and determine a spatial relationship between the two objects. For example, a method determines from the hierarchy that one object is inside the other or not. A method determines the distance between the origins of the two entities described by the objects. A method determines the distance between the outer surfaces of the two entities (a negative distance indicates the two entities overlap, a sufficiently large negative value compared to the size indicates one is inside the other). A method determines the orientation of the second entity relative to the first (e.g., to answer the question of whether one in front of the other). A method determines the global coordinates of either object. A method computes a movement for one object to increase or decrease distance to the other object. Many other methods to spatially transform or answer spatial queries are included in various embodiments.

In an example embodiment, each world object 300 is an extensible markup language (XML) document. XML is well known in the art of network communications. XML documents employ user-defined tags to divide a stream of data into separate portions which can be nested. One set of tags is used to portion information that describes spatial and organizational information.

Figure 4:
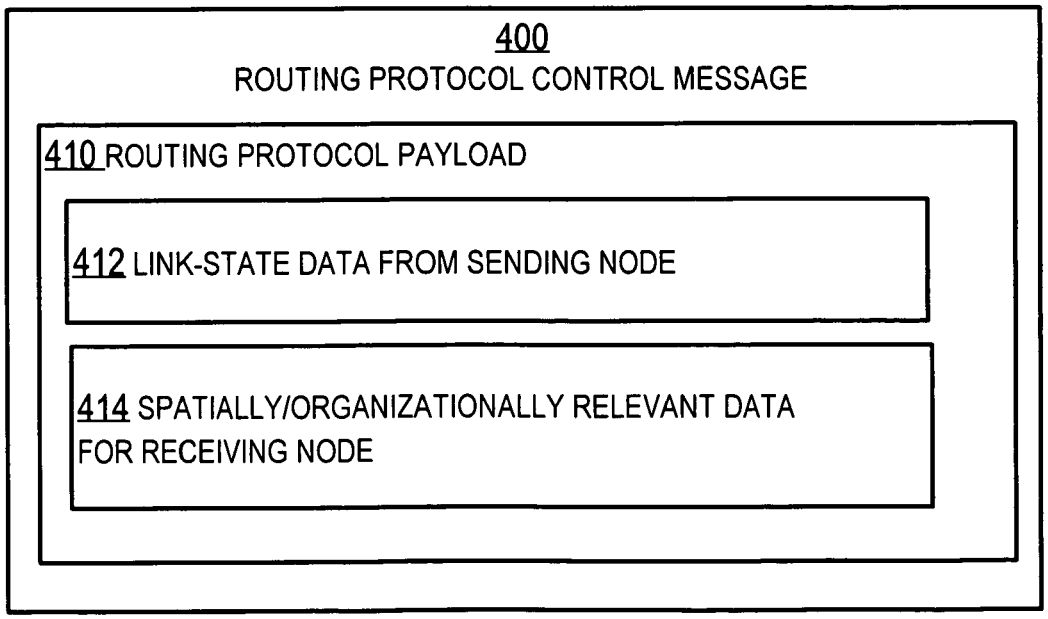
FIG. 4 is a block diagram that illustrates contents of a routing message communicated with a mobile node, according to an embodiment.

According to embodiments described in the next section, non-routing data from one or more world objects, like object 300, are sent from one network node to another based on spatial or organizational relationships. In some embodiments, the non-routing data is sent in a special world object data message. In some embodiments, the non-routing data is sent in a routing protocol control message, either along with or separately from routing data. FIG. 4 is a block diagram that illustrates contents of a routing protocol control message 400 communicated with a mobile node, according to an embodiment.

The routing protocol control message 400 includes header information that identifies the message as a routing protocol control message and indicates the length of the message and a payload 410. The payload 410 includes link-state data 412 from the sending node and non-routing (spatially or organizationally relevant) data 414 for the receiving node. The link-state data 412 indicates the current nodes directly connected to the sending node according to any of many well-known link-state protocols. In other embodiments, other routing data is included in addition to or instead of link-state data 412.

The spatially/organizationally relevant data 414 includes data from one or more objects that are used to update the objects stored on or reached through the receiving node. In some embodiments, the data 414 includes data that updates the contents of one or more objects already stored on the receiving node, e.g., object 140a on node 110a in FIG. 1. In some embodiments, the data 414 includes data that adds an object, e.g., object 140b, to the receiving node that is a replica of an object stored elsewhere in the distributed system, e.g., an object stored on node 110d of distributed system 100.

In an example embodiment, at least a portion of the routing protocol payload 410 is an XML document. For example, in some embodiments, one set of tags is used to portion information 412 that describes the link state and another set of tags is used to portion information that describes the spatially/organizationally relevant information 414. In some embodiments, the routing protocol payload 410 includes a compressed version of the XML document, using any compression method known to the sending and receiving nodes. There are many compression methods that are well known in the art and suitable for compressing an XML document in payload 410. In some embodiments, the XML document is an RSS stream.

3. Method for Distributing Data Based on Spatial State

Figure 5A:
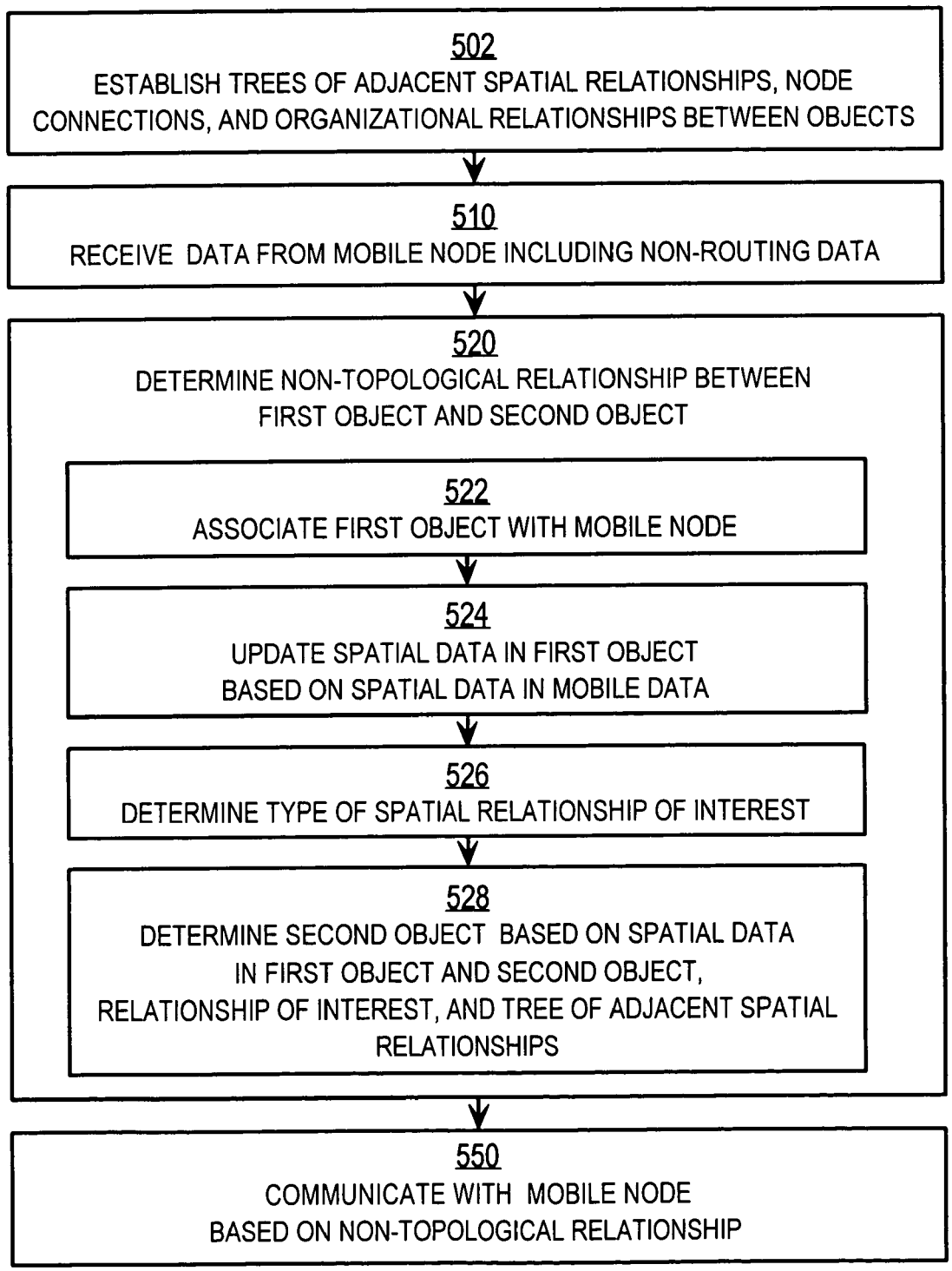
FIG. 5A is a flow diagram that illustrates at a high level a method for distributing data based on a spatial state of a mobile node, according to an embodiment.

FIG. 5A is a flow diagram that illustrates at a high level a method 500 for distributing data based on a spatial state of a mobile node, according to an embodiment. Although steps are shown In FIG. 5A and subsequent flow diagrams in a particular order for purposes of illustration, in other embodiments one or more steps are performed in a different order, or overlap in time, or are omitted, or are changed in some combination of these ways. In general, the processing represented by FIGS. 5A and 5B to handle the relationships and attributes of children and parents of an object representing a network node, is typically performed by the affected network node in the distributed system and relayed as messages to other network nodes in the distributed system.

In step 502, tree data structures are established that describe network node connections, spatial relationships and organizational relationships between objects in an Infosphere. For example, four tree data structures are established. A network tree data structure describes CONNECTED-TO relationships between network nodes 110 of a distributed data system 100 from a network topology root object 210. A spatial tree data structure describes INSIDE-A relationships between objects of a distributed data system 100 from a spatial root object 220. An organizational tree data structure describes IS-A relationships between objects of a distributed data system 100 from an organizational root object 230. A world tree data structure describes relationships to the root objects 210, 220, 230 from a World Root object 202.

In some embodiments, each tree data structure describes a complete tree and is centrally located on one node. In some embodiments, each tree data structure describes a compete tree and is replicated on multiple network nodes. In some embodiments, each tree data structure describes a portion of a tree and multiple tree structures that together describe the whole tree are distributed over multiple nodes, with or without replication. In some embodiments, each tree data structure describes a parent-child relationship and is stored in an individual object, with or without replication, and multiple tree structures together describe the whole tree. In an illustrated embodiment, each node begins with a pre-configured initial Infosphere and associated trees, and communicates with other nodes to completely fill in at least the spatial tree.

In an example embodiment, each world object in the network node tree, the spatial tree, and the organizational tree is a smart world object. When a network node of the distributed system is powered up, a distributed system boot-up process is executed. The distributed system boot up process loads data that describe a version of the Infosphere from one or more pre-configured databases, if any. One pre-configured database describes an initial state for one or more objects of the Infosphere. For example, each network node boots with a description of buildings 192a, 192b as objects in their database. Those buildings own two rooms; for example building 192a owns objects 224b, 224a describing rooms 190a, 190b. Similarly, each network node boots up with a description of a rescue organization, at least down to a platoon level. So, there are multiple world objects in the Initial Infosphere. Each has a location, parent and shape. The other pre-configured database describes one or more Shape objects that are useful for the Infosphere. For example, the database of shapes includes a shape object called Human, which is an n-tuple of coordinates that define a human shape. As a further example, the database of shapes includes a shape object called box, which is an n-tuple of coordinates that define a box shape used as a shape for some rooms.

The network node also retrieves data that indicates its own identity, such as its own media access control (MAC) number or its own serial number, or router number. The network node then determines whether it is identified as an object within the initial state of the Infosphere. If so, then the found world object becomes a special object called the ThisWorldObject that is an instance of the ThisWorldObject class and is treated specially by virtue of several attributes and methods of that class. For example, access point network node 110a determines that it is a network node object 214a in the initial Infosphere; and network node object 214a owns an instance of ThisWorldObject. If the network node is not found within the initial Infosphere, then the node creates a ThisWorldObject to represent itself, which at first is neither owned nor pointed to by other objects in the initial Infosphere. For example, personal router network node 110d is not found in the initial Infosphere, and creates a ThisWorldObject owned by a network object (e.g., 214b) to represent itself. At boot-up time, object 214b is not related to any other object in the hierarchy (e.g., does not include an IS-A relationship 236c to organizational unit 234a representing a particular rescue worker).

In step 510, mobile data that includes spatial or organizational data is received from a mobile node. Spatial data includes any combination of location, size, shape and orientation data. In the illustrated embodiment, the mobile data includes non-spatial data, such as data relevant to one or more organizational objects associated with the mobile node (e.g., data about the rescue worker carrying node 110d). The mobile node is associated with a data object in the distributed data system (e.g., 214b).

In an example embodiment, during step 510, any sensor connected to a network node measures its environment and reports data to appropriate data objects. For example, a GPS sensor connected to network node 110d reports a current position to a position reaction object owned by the brain object of the smart ThisWorldObject created by node 110d and owned by object 214b. It is further assumed, for purposes of illustration that a rescue worker's identification chip is queried and reports the rescue worker's identification (worker ID) and platoon identification (platoon ID) to a user reaction object owned by the brain object of ThisWorldObject created by node 110d. It is further assumed, for purposes of illustration, that the wireless router reports the receipt of routing protocol control packets for discovery from access point network node 110b. Thus network node 110d receives data including non-routing data, such as spatial data that indicates its GPS position, and organizational data that indicates a rescue worker or a certain platoon. It is further assumed for purposes of illustration that access point network node 110b and the certain platoon have objects in the initial Infosphere, but that the mobile network node and the particular rescue worker are not represented by objects in the initial Infosphere. Thus during the initial execution of 510, new objects 214b and 234a are instantiated in the illustrated embodiment.

As a result, the mobile network node 110d is associated with object 214b in the hierarchies 200 of objects in the distributed system 100. The mobile network node 110d is also associated with the object 234a that represents a rescue worker by virtue of the IS-A relationship 236c. Thus, in the example, both objects 214b and 234a are associated with mobile network node 110d.

In some embodiments, this data is sent by node 110d and received at node 110b in a routing protocol control message, e.g., message 400. The link-state data 412 indicates that new network node object 214b is being added to the Infosphere. The spatially/organizationally relevant data 414 indicates that new object 234a is being added to the Infosphere, as described in more detail below with reference to step 550. When the worker represented by object 234a later moves to another room, another message is received, by perhaps a different access point network node, that includes spatially relevant data 414 that indicates the way-point object owned by objects 214b, 234a is being updated with one or more new coordinates or orientation. In the example embodiment, the data 414 is formatted as an RSS update for the XML document representing the world objects 214b, 234a associated with network node 110d. An advantage of using RSS is that it is designed to update the information in a particular set of one or more tags of an XML document rather than reproducing the entire document.

Similarly, the link-state data 412 indicates that the objects that own object 214b are being updated because of a change in connections. The new connections include direct wireless connections with nodes 110a, 110b and drop previous connections with other network nodes, e.g., node 110e in a different building. In some embodiments, the data 412 is also formatted as an RSS update, this time as an update for the XML documents representing the world objects that represent the nodes (e.g., node 110e) that formerly owned the network node 110d. In some embodiments, the data 412 is formatted as an RSS update for the XML documents representing the world objects (including object 214a) that represent the nodes 110a, 110b that now own the network node 110d. In some embodiments, the data is formatted as an RSS update for XML documents for both the former and new owners of the node 110d.

In step 520, a non-topological relationship is determined between an object associated with the mobile node and a second object in the distributed data system based on the non-routing data. For example, a relationship is determined between object 214b or object 234a (or both) and a spatial unit such as 224b based on the spatial data.

During step 520 in an example embodiment, each smart world object in the Infosphere enters an operational loop in which its brain is allowed to think for a specific amount of time. The result of this thinking operational loop is a behavior that may cause one or more smart world objects to change their relationship with other objects in one or more hierarchies. For example, during the boot-up process, a smart organizational-unit object (a worker object 234a) is instantiated as an IS-A child of the certain platoon object to represent the particular rescue worker. As a further example, the network node object 214b that owns the ThisWorldObject created by node 110d determines that is has a CONNECTED-TO relationship with a network node object representing 110b in the initial Infosphere, and has an IS-A relationship with the worker object 234a. During subsequent executions of step 520, one or more relationships change as a result of changes in the attribute values associated with one or more objects received during step 510.

It is assumed for the purposes of illustration, that after the boot-up process, the new coordinates of mobile node 110d place the mobile node inside of room 190a that is represented in the distributed system 100 by object 224b. In this embodiment, the methods of object 234a are used with the new coordinates of its way-point object to determine whether the object 234a is inside an object of the spatial hierarchy. The method takes into consideration the size and shape of both the object 234a and the object of the spatial hierarchy. The result of this step is that an IN-A relationship 226d is established between the object 234a representing the particular rescue worker and the object 224b representing the room 190a.

In one embodiment, the method is first applied to the child objects 222a, 222b, 221a of the spatial root object 220. For purposes of illustration, it is assumed that the method determines that object 234a is inside theater object 222b. Next the children of theater object 222b are examined to find the child for which the object 234a is inside. The process is repeated until no child is found for which the object 234b is inside. The object 234b is therefore inside the parent and an INSIDE-A relationship is added to the spatial tree. In another embodiment, the process starts with the current INSIDE-A parent of the object 234a, if any. If the object 234a is not inside that parent any longer, the parent's parent is operated on next until a parent is found inside of which the object 234b is located. Then the children of that parent are examined until no child is found for which the object is inside.

Thus, it is determined in step 520 that object 234a is located inside object 224b that represents room 190a; and the spatial tree structure is updated to include an INSIDE-A relationship 226d from object 234a for the rescue worker to the object 224b representing room 190a.

In step 550, communications with the mobile node are based at least in part on the non-topological relationship. In an illustrated embodiment, the network node receiving the mobile data determines whether any attribute of the object that owns the ThisWordlObject has changed. That change is scheduled to be transmitted to other nodes in the network. In the illustrated embodiment, during network protocol communications with neighboring nodes, this node sends the scheduled changes to all its neighbors and receives the scheduled changes from the other nodes. In some embodiments, the changes received from the other node are scheduled for transmission during the next communications with yet other nodes. The Infosphere changes are thus propagated throughout the network.

In some embodiments, the transmitted changes are filtered so that only certain information is sent. For example, the spatial data is transmitted to all neighboring nodes, but data about the physical condition of the rescue worker is sent only to one node and directed to an organizational health server, that serves as a central repository for health information. In some embodiments, only changes received from another node that affect ThisWorldObject are stored for transmission to other nodes.

For example, after initial boot up, a routing protocol message 400 is sent by mobile node 110d that includes routing data 412 that indicates the formation of new object 214b that is CONNECTED-TO access point network node 214a and includes non-routing data 414 that indicates the formation of new object 234a, the IS-A relationship between 214b and 234a, and the IS-A relationship between object 234a and the object representing the certain platoon. In some embodiments, the non-routing data 414 also includes the IN-A relationship between organizational object 234a and spatial object 224b. In some embodiments, the receiving node determines the latter IN-A relationship. Another embodiment of step 550 is described in more detail below with reference to FIG. 5B.

In an illustrated embodiment, step 520 includes steps 522, 524, 526, 528. In step 522 a first object is associated with the mobile node. For example, object 234a representing a particular rescue worker is associated with mobile node 110d.

In step 524, spatial data in the first object is updated based on the spatial data received from the mobile node in step 510. For example, the coordinates of a way-point object owned by object 234a are updated based on the RSS data describing the coordinate change received during step 510.

In step 526, a spatial relationship of interest is determined. For example, it is determined in step 526 that a spatial relationship of interest is for objects in front of the rescue worker, as well as determining what spatial object the rescue worker is inside.

In step 528, a second object is determined base on the spatial data in the first object and the second object, the relationship of interest, and the tree of spatial relationships. For example, based on the new location of the rescue worker and the tree of INSIDE-A spatial relationships, it is determined that the object 234a representing the rescue worker is INSIDE-A object 224b representing room 190a. Based on the relationship of interest and the orientation of the object 234a representing the rescue worker, it is determined that the rescue worker is facing objects in the north wall of room 190a. Several objects owned by the room object 224b in the north wall are therefore determined during step 528. It is assumed for purposes of illustration that an object describing a gas line is among the objects owned by the room object 234b and located in the north wall. Thus the second object describes a gas line. This information could be critical for the rescue worker, for example, if the rescue worker is about to cut into the north wall to access a person pinned behind the wall by rubble from the collapse of the building in the adjacent room.

Thus, in some embodiments, the second object is the object defined by the spatial tree structure (object 224b representing room 190a defined by the INSIDE-A relationship of the tree structure). In some embodiments the second object is based on a different spatial relationship than is used in the spatial tree (an object representing a gas line in a wall AHEAD-OF the rescue worker).

In step 550, communication with the mobile node is performed based on the spatial relationship. For example, after the initial boot-up, some or all of the content of object 224b describing room 190a is transmitted to mobile node 110d. The partial content, for example, is the portion that describes the part of the room ahead of the rescue worker, as described above. It is an advantage to send only partial content because then the most critical information is sent over the network without consuming excess network resources transmitting data of no interest to the receiver. Step 550 includes receiving data from the mobile network node, e.g., as described above during boot-up.

Also during step 550, based on the network topology hierarchy, this communication is routed through one of the nodes in direct communication with mobile node 110d, e.g., node 110a or node 110b, depending on the routing protocol and routing methodology.

In an illustrated embodiment, RSS data describing all or part of room 190a from object 224b is included in spatially/organizationally relevant data 414 in a router protocol message 400. In this embodiment, RSS data describing link-state data 412 that indicates the network nodes and subnetworks connected to node 110a is included in link-state data 412 in the router protocol message 400. These link-state data are extracted from object 214a that represents node 110a.

In some embodiments, step 550 includes routing the data (e.g., determining whether to use node 110a or 110b), or configuring one or more nodes (e.g., configuring node 110b to use a different power level and radio frequency {RF}), or commanding a mobile node to move (e.g., moving node 110c on a robot toward node 110a and away from node 110b), or some combination, based on the spatial relationship (e.g., nodes 110c and rescue worker carrying node 110d are INSIDE-A room 190a represented by object 224b).

Figure 5B:
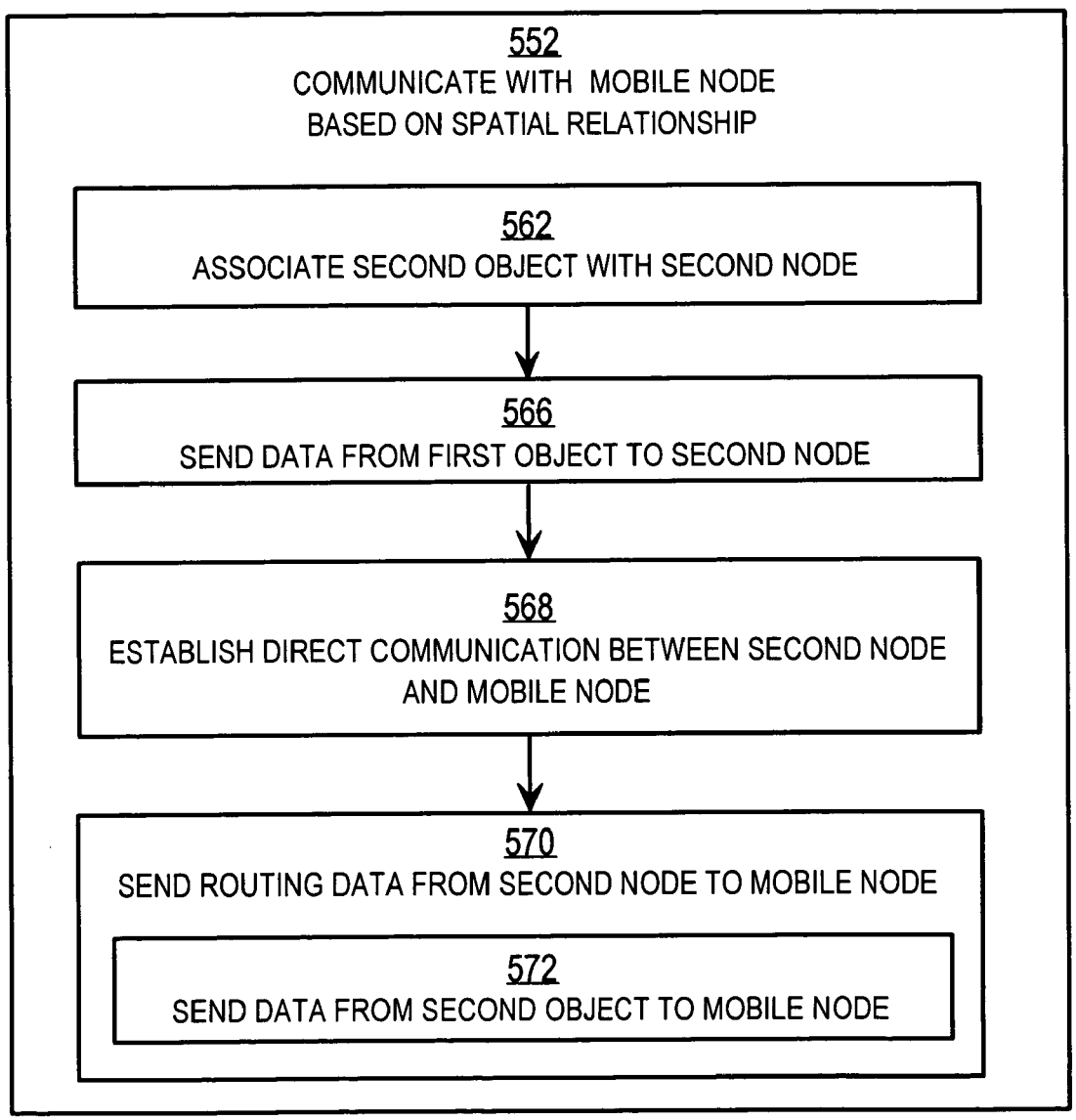
FIG. 5B is a flow diagram that illustrates in more detail a step of FIG. 5A, according to an embodiment.

FIG. 5B is a flow diagram that illustrates in more detail astep \, according to an embodiment 552 of step 550. In the illustrated embodiment, step 552 includes steps 562, 566, 568, 570.

In step 562, a second network node is associated with the second object. In the example described above, the second object is the object 224b that represents room 190a. During step 562, a second node is associated with object 224b. For example, access point network node 110a, that is represented by object 214a, is associated with object 224b that represents room 190a. This association is based on the INSIDE-A relationship 226c between object 214a (node 110a) and object 224b (room 190a) in the initial Infosphere.

In step 566, data is sent from the first object associated with the mobile node, to the second node. In one of the examples described above, the first object is the object 234a that represents the rescue worker who carries node 110d. Thus, in this example, data is sent from the object 234a describing the rescue worker to the node 110a. For example, a copy of the object 234a is replicated at node 110a to support context sensitive communications at node 110a. In some embodiments, a copy of the object 214b that describes network node 110d associated with object 234a is also replicated at node 110a to support context sensitive communications at node 110a. In some embodiments, step 566 is omitted or follows step 568 or 570, described below.

In step 568, direct communications are established between the second node and the mobile node. For example, it is determined at node 110a to form an adjacency relationship with node 110d. As a consequence, topological data 120 at node 110a is updated to show a connection with node 110d. In some embodiments, step 568 is omitted.

In step 570 routing data is sent from the second node to the mobile node. For example, some or all of the topological data 120 stored at node 110a is sent to node 110d. In some embodiments, some or all of the network node objects owned by object 214a that represents node 110a, and stored on node 110a as object 140a, is sent to node 110d. In an illustrated embodiment, the routing data is sent in link-state data 412 of message 400 as an RSS update stream from an XML document representing topological data 120 or object 214a.

In some embodiments, step 570 includes step 572. In step 572, data from the second object is included in the routing message from the second node associated with the second object. In the example described above, the second object is the object 224b that represents room 190a. Thus room data from object 224b is included in the message 400 sent to the mobile node 110a. For example, the entire object 224b is sent to mobile node 110d to be replicated on the mobile node. Since the mobile node is now located inside room 190a, the data described in the room object 224a is relevant to the mobile node. In an illustrated embodiment, the room data is sent as an RSS update stream from the XML document representation of object 224b in the spatially/organizationally relevant data 414 of message 400.

As shown in the foregoing embodiments, infomatics within the Infosphere are propagated to network nodes in a spatially/organizationally relevant way. An advantage of this method is that such infomatics propagation does not burden network resources with the transmission of distributed data not likely to be used at the receiving node.

4. More Example Embodiments

In this section, additional embodiments of the invention are described with reference to FIG. 5A and FIG. 5B.

4.1 Routing Based on Spatial State

In the next example embodiment, the first object is the object 214b that represents the mobile node 110d and the second object is an object (not shown) that represents the access point network node 110b that is closest to the mobile node 110d. It is assumed for purposes of illustration that the closest access point is network node 110b in the room 190b below room 190a.

In step 510, data is received from the mobile node 110d that indicates its current position, e.g., local triangulation system with coordinates referenced to the position of a personnel carrier represented in the distributed system 100 by object 234b. For example, the data is received at a process on network node 110e from subnetworks 102 through communications links (not shown) from node 110d to the personnel carrier (not shown) to another access point (not shown) on subnetworks 102. The received data indicates that the mobile node has a particular node identification (node ID).

During step 520, a spatial relationship is determined between a first object associated with node 110*d* and a second object. In step 522 the process on node 110*e* determines the first object is constrained to be the object that represents the mobile node itself. Based on the node ID, the process at node 110*e* interacts with processes on one or more nodes of the distributed system 100 during step 522 to determine that object 214*b* describes node 110*d*. In other embodiments, the object 214*b* is included in the data received from the mobile node 110*d*. During step 524, the way-point owned by object 214*b* is updated based on the spatial data received in step 510. For example, in embodiments in which the object 214*b* received during step 510, the received object 214*b* is replicated to other nodes where the object is stored on the distributed system.

In step 526, the process at node 110*e* determines that the spatial relationship is the closest object.

In step 528, the process at node 110*e* determines that the second object is constrained to be an access point and therefore determines the closest access point to the mobile node 110*d*. Any method may be used. In an illustrated embodiment, the object 214*b* includes data that indicates that the way-point coordinates owned by the object are referenced to a position of the personnel carrier represented by object 234*b*. The process at node 110*e* interacts with processes on one or more nodes of the distributed system 100 to determine the location in the way-point object owned by object 234*b* that represents the personnel carrier. The process at node 110*e* determines the position of the object 214*b* based on its relative coordinates and the coordinates of the object 234*b* relative to the coordinates of the theater that is represented by object 222*b*. In one embodiment, the process at node 110*e* looks at the way-point objects owned by access points network nodes in the network node topology hierarchy and invokes a method of theater object 222*b* to determine a distance between each access point and the object 214*b*. In another embodiment, the process at node 110*e* determines that network node 110*d* is INSIDE-A object 224*b* and looks only at network node objects that have an INSIDE-A relationship with an ancestor (e.g., a parent or a parent's parent, etc.) of object 224*b*. Of these network node objects, the process at node 110*e* looks at the way-point objects owned by these objects and invokes a method of theater object 222*b* to determine a distance between the object 214*b* and each of these network node objects. The closest one is determined to be the second object. Thus a network node object representing node 110*b* is determined to be the second object during step 528.

In step 562, the second object is associated with a network node. In the example, this is trivial because the second object represents the network node 110*b*, thus in step 562, the network node 110*b* is identified.

In step 566, data is sent from object 214*b* to node 110*b*. For example, node 110*e* causes object 214*b* to be sent to node 110*b* so that the object 214*b* is replicated on node 110*b*. In some embodiments, step 566 is omitted.

In step 568, a direct communication is established between the mobile node 110*d* and the second node, 110*b*. For example, network node 110*d* is made adjacent to network node 110*b*. In some embodiments, network node 110*b* changes power or frequency to establish communications with network node 110*d*.

In step 570, routing data describing the network nodes and subnets owned by node 110*b* is sent from network node 110*b* to network node 110*d* in a routing protocol control message. In step 572, the message includes non-routing data from the second object. For example, spatially relevant data 414 includes a location, shape, size, and orientation of access point network node 110*b* as well as some infomatics, such as age and health and organizational ownership of the access point network node 110*b*.

4.2 Directing Non-Routing Data Based on Spatial State

In another example, mobile node 110*d* stores several objects of the distributed system, including a copy of the object 214*b*, describing itself, and the object 234*a*, describing the rescue worker who carries the mobile node 110*d*. The object 234*a* is associated with the mobile node 110*d*. For purposes of illustration, it is assumed that the object 234*a* includes data that indicates the current health of the rescue worker, e.g., current oxygen levels in the rescue worker's blood obtained from sensors worn by the rescue worker and connected to a host which is connected to mobile node 110*d* over a network segment that represents a personal area network.

In step 510, network node 110*e* receives data indicating a current position for mobile node 110*d*, via a personnel carrier, as described above.

During step 520, it is determined that a first object 234*a* that represents the rescue worker who carries mobile node 110*d* is associated with a second object 224*b* that represents room 190*a* based on the INSIDE-A relationship 226*d* determined from the spatial data of mobile node 110*d*, as described above.

In step 550, communications with the mobile node are based on this relationship. In step 562 it is determined that access point network node 110*a* is associated with object 224*b* that represents room 190*a*, based on the INSIDE-A relationship 226*c*, as described above.

During step 568, performed before step 566 in this embodiment, direct communications are established between network node 110*a* and 110*d*. This includes sending a routing protocol control message from the node 110*a* to node 110*d*.

During step 566, data from the first object 234*a* that represents the rescue worker is sent to the second node 110*a* from the mobile node 110*d*. For example, the current oxygen level in the worker's blood is sent to update a replica of the object 234*a* on another node in the distributed system, such as at a central field network node for the rescue organization at node 110*e* in another building.

A routing protocol control message is sent from node 110*d* to node 110*a* in response to the control message sent by node 110*a* during step 568. In this embodiment, the blood oxygen level is sent to the second node 110*a* in spatially/organizationally relevant data 414 in a routing protocol control message 400 as an RSS update to the XML document representing object 234*a* along with link-state data 412 describing the current connections to mobile node 110*d*. The spatially/organizationally relevant data 414 is forwarded to the replicated object 234*a* on node 110*e* in a routing protocol control message from node 110*a* to node 110*e*. In some embodiments, this routing protocol control message from node 110*a* to node 110*e* does not include link-state data 412.

4.3 Temporary Spatial Objects

In some embodiments, method 500 includes generating temporary objects in the spatial hierarchy based on spatial state of a mobile node. In these embodiments, step 510 includes receiving data from a mobile node that indicates a temporary object to be associated with a spatial object. The temporary world object, called herein a beacon object, indicates additional data associated with the second object spatially related to the spatial state of the mobile node.

For example, based on the spatial data received in step 510, a spatial unit object, such as room object 224*b* that represents room 190*a*, is associated with the mobile node 110*d*. A beacon object, like world object 300, included in the data received during step 510, such as in spatially/organizationally relevant data 414 of a routing protocol control message 400, is then also associated with object 224b that represents room 190a. The other attributes 302d of the beacon object indicate a lifetime of the object and a state associated with the beacon. Beacon states include any information that a user of the mobile node desires to associate with the spatial object. Example beacon states include, but are not limited to: spatial unit (e.g., room) represented by spatial object has been searched and found clean; injured person found; dangerous equipment found; hostile persons detected; caller identification (caller ID) information associated with a telephone in a room; contact information associated with a room; schedule information associated with a meeting room; history of occupancy of a room (e.g., Fred Apple, John Banana and Bill Coconut were in the room on Tuesday, Wednesday and Thursday, respectively); one or more maps from the room to an emergency exit for the building; broadcast information relevant for the room (e.g., current stock quotes for the owning and renting corporate entities associated with the room, current weather in the vicinity of the room's building, current traffic in the vicinity of the room's building); environmental data recorded from that moment in the room (e.g, temperature, humidity, oxygen levels, pollutant levels); other information associated with the room (e.g., name of song that is playing on the room audio speakers or intercom).

4.4 Spatial Queries

In some embodiments, method 500 includes responding to queries using spatial constructs. In these embodiments, step 510 includes receiving data from a mobile node that includes a query for information about one or more objects based on spatial state. For example, a query is included in spatially/organizationally relevant data 414 of a routing protocol control message 400. The query specifies one or more spatial conditions.

In an example embodiment, the query indicates a request for data about the particular spatial unit that the mobile node is immediately inside of, or data about spatial units one or more levels above or below that particular spatial unit.

As another example, the query indicates a request for data about all spatial objects or organizational objects or network node objects within a particular distance of the mobile node. Here distance is any distance determined by the methods that operate on object n-tuples, such as number of meters, number of hops, number of dB of transmission strength.

As another example, the query indicates a request for data about all spatial objects or organizational objects or network node objects within a particular direction of the object associated with the mobile node, e.g., ahead of the rescue worker represented by object 234a. Here direction is any function determined by the methods that operate on object n-tuples, such as number of horizontal and vertical degrees from forward, direction of hops, transmission frequency.

In these embodiments, the spatial relationships and objects determined in step 520 depend on the spatial construct in the query. The data communicated directly or indirectly to the mobile node in step 550 depends on the spatial relationships and objects determined in step 520.

5.0 Implementation Mechanisms—Hardware Overview

Figure 6:
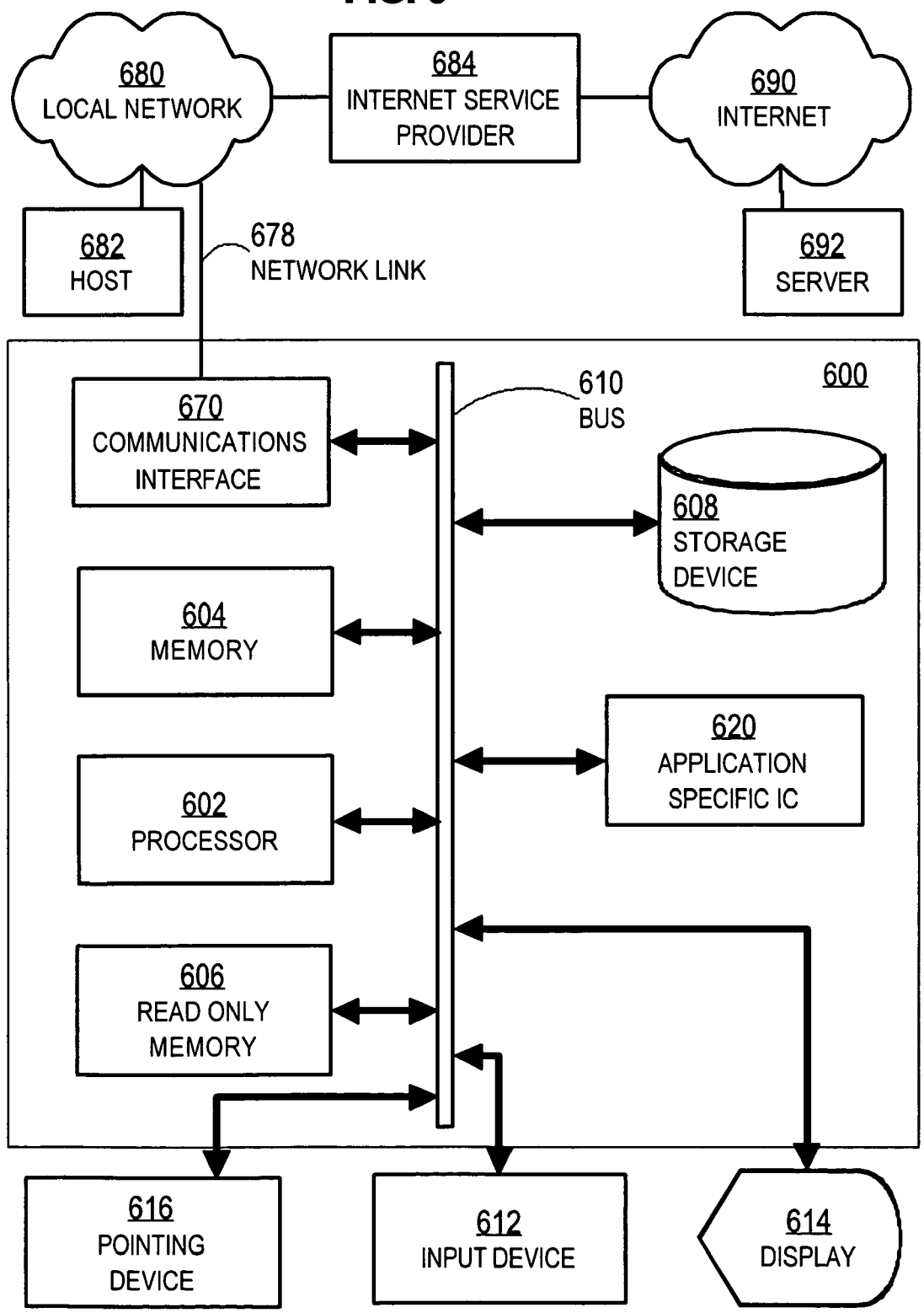
FIG. 6 is a block diagram that illustrates a computer system upon which an embodiment of the invention may be implemented.

FIG. 6 is a block diagram that illustrates a computer system 600 upon which an embodiment of the invention may be implemented. Computer system 600 includes a communication mechanism such as a bus 610 for passing information between other internal and external components of the computer system 600. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non zero electric voltage, represent two states (0, 1) of a binary digit (bit). A sequence of binary digits constitutes digital data that is used to represent a number or code for a character. A bus 610 includes many parallel conductors of information so that information is transferred quickly among devices coupled to the bus 610. One or more processors 602 for processing information are coupled with the bus 610. A processor 602 performs a set of operations on information. The set of operations include bringing information in from the bus 610 and placing information on the bus 610. The set of operations also typically include comparing two or more units of information, shifting positions of units of information, and combining two or more units of information, such as by addition or multiplication. A sequence of operations to be executed by the processor 602 constitute computer instructions.

Computer system 600 also includes a memory 604 coupled to bus 610. The memory 604, such as a random access memory (RAM) or other dynamic storage device, stores information including computer instructions. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of computer instructions. The computer system 600 also includes a read only memory (ROM) 606 or other static storage device coupled to the bus 610 for storing static information, including instructions, that is not changed by the computer system 600. Also coupled to bus 610 is a non volatile (persistent) storage device 608, such as a magnetic disk or optical disk, for storing information, including instructions, that persists even when the computer system 600 is turned off or otherwise loses power.

Information, including instructions, is provided to the bus 610 for use by the processor from an external input device 612, such as a keyboard containing alphanumeric keys operated by a human user, or a sensor. A sensor detects conditions in its vicinity and transforms those detections into signals compatible with the signals used to represent information in computer system 600. Other external devices coupled to bus 610, used primarily for interacting with humans, include a display device 614, such as a cathode ray tube (CRT) or a liquid crystal display (LCD), for presenting images, and a pointing device 616, such as a mouse or a trackball or cursor direction keys, for controlling a position of a small cursor image presented on the display 614 and issuing commands associated with graphical elements presented on the display 614.

In the illustrated embodiment, special purpose hardware, such as an application specific integrated circuit (IC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends and receives electrical, acoustic or electromagnetic signals, including infrared and optical signals, that carry information streams, such as digital data. Such signals are examples of carrier waves.

The term computer-readable medium is used herein to refer to any medium that participates in providing instructions to processor 602 for execution. Such a medium may take many forms, including, but not limited to, nonvolatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape, or any other magnetic medium, a compact disk ROM (CD-ROM), or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Network link 678 typically provides information communication through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690. A computer called a server 692 connected to the Internet provides a service in response to information received over the Internet. For example, server 692 provides information representing video data for presentation at display 614.

The invention is related to the use of computer system 600 for implementing the techniques described herein. According to one embodiment of the invention, those techniques are performed by computer system 600 in response to processor 602 executing one or more sequences of one or more instructions contained in memory 604. Such instructions, also called software and program code, may be read into memory 604 from another computer-readable medium such as storage device 608. Execution of the sequences of instructions contained in memory 604 causes processor 602 to perform the method steps described herein. In alternative embodiments, hardware, such as application specific integrated circuit 620, may be used in place of or in combination with software to implement the invention. Thus, embodiments of the invention are not limited to any specific combination of hardware and software.

The signals transmitted over network link 678 and other networks through communications interface 670, which carry information to and from computer system 600, are exemplary forms of carrier waves. Computer system 600 can send and receive information, including program code, through the networks 680, 690 among others, through network link 678 and communications interface 670. In an example using the Internet 690, a server 692 transmits program code for a particular application, requested by a message sent from computer 600, through Internet 690, ISP equipment 684, local network 680 and communications interface 670. The received code may be executed by processor 602 as it is received, or may be stored in storage device 608 or other nonvolatile storage for later execution, or both. In this manner, computer system 600 may obtain application program code in the form of a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to an infra-red signal, a carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing data in a distributed system implemented in a network, comprising the steps of:
receiving first mobile data that includes non-routing data describing a mobile node of a plurality of network nodes, each network node implemented as one of an end node configured to originate or terminate data communication via at least one network link or a network device configured to pass the data communication via the at least one network link, the first mobile data received from the mobile node via the network,
wherein the mobile node is associated with a first data item of a plurality of data items in a distributed data system on the plurality of network nodes, the non-routing data includes at least one of organizational data or spatial data describing a non-location spatial state of the mobile node, the organizational data is associated with an organizational data item in a multi-level hierarchy of organizational data items in the distributed data system, and the spatial data describing the non-location spatial state of the mobile node including at least one of a physical location, shape, size, or orientation;

the distributed system establishing a non-topological relationship, based on the non-routing data, between the first data item representing the mobile node and a different second data item of the plurality of data items and representing a physical object or a different second network node of the plurality of network nodes, wherein the non-topological relationship is at least one of a spatial relationship or an organizational relationship in the multi-level hierarchy; and the distributed system causing content relevant to the non-topological relationship to be communicated between the mobile node and the second network node and to the mobile node based at least in part on the non-topological relationship, the distributed system further sending to the mobile node a command to improve network communications based on at least one of moving relative to another one of the network nodes or changing a radio characteristic of the mobile node, the command generated based on the spatial relationship between the mobile node and the physical object or the different second network node represented by the second data item.

2. A method as recited in claim 1, wherein:

a first physical entity is associated with the first data item; and a second physical entity is associated with the second data item.

3. A method as recited in claim 2, wherein the non-topological relationship indicates at least one of:

one of the first physical entity or the second physical entity is inside the other;

the first physical entity is a particular distance from the second physical entity; or the first physical entity is oriented in a particular direction with respect to the second physical entity.

4. A method as recited in claim 2, wherein the non-topological relationship indicates that at least one of the first physical entity or the second physical entity is visible to the other.

5. A method as recited in claim 2, wherein the non-topological relationship indicates that the first physical entity and the second physical entity are within communication distance for a particular type of communications.

6. A method as recited in claim 2, wherein the non-topological relationship indicates that at least one of the first physical entity or the second physical entity is within a spatial volume of influence of the other.

7. A method as recited in claim 2, wherein the non-topological relationship indicates that one of the first physical entity or the second physical entity belongs to an organizational component of the other.

8. A method as recited in claim 1, wherein:

at least some data items of the plurality of data items are related in a spatial tree data structure in the distributed data system different from a network topology tree data structure; and a particular pair of data items with spatial data that indicates the data items are spatially nested form a parent-child relationship in the spatial tree.

9. A method as recited in claim 8, wherein:

at least some data items of the plurality of data items are related in an organizational tree data structure in the distributed data system; and a particular pair of data items that are organizationally nested form a parent-child relationship in the organizational tree.

10. A method as recited in claim 1, said step of causing content to be communicated with the mobile node further comprising sending data from the second data item to the mobile node.

11. A method as recited in claim 1, said step of causing content to be communicated with the mobile node further comprising associating with the second data item data included in the first mobile data.

12. A method as recited in claim 1, said step of causing content to be communicated with the mobile node further comprising:

receiving second mobile data from the mobile node; and associating the second mobile data with the second data item.

13. A method as recited in claim 8, said step of causing content to be communicated with the mobile node further comprising causing spatial tree data that describes at least a portion of the spatial tree data structure to be communicated, wherein the portion is based on the non-topological relationship.

14. A method as recited in claim 1, said step of causing content to be communicated further comprising causing content formatted according to an extensible markup language (XML) to be communicated.

15. A method as recited in claim 1, said step of causing content to be communicated further comprising causing content to be communicated in a payload of a routing protocol data packet, which is designed to communicate data indicating a connection to a node of the plurality of network nodes.

16. A method as recited in claim 1, said step of causing content to be communicated with the mobile node further comprising causing data to be generated by using a subscription stream to obtain data from a data item of the plurality of data items based at least in part on the non-topological relationship.

17. A method as recited in claim 16, said step of causing data for the mobile node to be generated further comprising causing a really simplified syndication (RSS) stream to generate change data from a data item formatted in an extensible markup language (XML) based at least in part on the non-topological relationship.

18. A method for managing data in a distributed system, comprising the steps of:

receiving first mobile data that includes non-location spatial data describing a corresponding non-location spatial attribute of a mobile node of a plurality of network nodes, the first mobile data received from the mobile node, wherein the mobile node is associated with a first data item of a plurality of data items in a distributed data system on the plurality of network nodes, and the non-location spatial data describing at least one of a physical shape, size, or orientation of the mobile node;

the distributed system establishing a spatial relationship between the first data item and a different second data item of the plurality of data items based on the first mobile data, the second data item associated with a physical object; and the distributed system causing communications to the mobile node of a different third data item of the plurality of data items, based at least in part on the spatial relationship established relative to the mobile node and the physical object, the third data item commanding the mobile node to improve network communications based on at least one of moving relative to another of the network nodes or changing a radio characteristic of the mobile node, the command generated based on the spatial relationship between the mobile node and the physical object.

19. An apparatus for managing data in a distributed system implemented in a network, comprising:

means for receiving first mobile data that includes non-routing data describing a mobile node of a plurality of network nodes, each network node implemented as one of an end node configured to originate or terminate data communication via at least one network link or a network device configured to pass the data communication via the at least one network link, the first mobile data received from the mobile node via the network, wherein the mobile node is associated with a first data item of a plurality of data items in a distributed data system on the plurality of network nodes, the non-routing data includes at least one of organizational data or spatial data describing a non-location spatial state of the mobile node, the organizational data is associated with an organizational data item in a multi-level hierarchy of organizational data items in the distributed data system, and the spatial data describing the non-location spatial state of the mobile node including at least one of a physical location, shape, size, or orientation;

means for establishing a non-topological relationship, based on the non-routing data, between the first data item representing the mobile node and a different second data item of the plurality of data items and representing a physical object or a different second network node of the plurality of network nodes, wherein the non-topological relationship is at least one of a spatial relationship or an organizational relationship in the multi-level hierarchy; and means for causing content relevant to the non-topological relationship to be communicated between the mobile node and the second network node and to the mobile node based at least in part on the non-topological relationship, the distributed system further sending to the mobile node a command to improve network communications based on at least one of moving relative to another one of the network nodes or changing a radio characteristic of the mobile node, the command generated based on the spatial relationship between the mobile node and the physical object or the different second network node represented by the second data item.

20. An apparatus for managing data in a distributed system, comprising:

means for receiving first mobile data that includes non-location spatial data describing a corresponding non-location spatial attribute of a mobile node of a plurality of network nodes, the first mobile data received from the mobile node, wherein the mobile node is associated with a first data item of a plurality of data items in a distributed data system on the plurality of network nodes, and the non-location spatial data includes describing at least one of a physical shape, size, or orientation of the mobile node;

means for establishing a spatial relationship between the first data item and a different second data item of the plurality of data items based on the first mobile data, the second data item associated with a physical object; and means for causing communications to the mobile node of a different third data item of the plurality of data items, based at least in part on the spatial relationship established relative to the mobile node and the physical object, the third data item commanding the mobile node to improve network communications based on at least one of moving relative to another of the network nodes or changing a radio characteristic of the mobile node, the command generated based on the spatial relationship between the mobile node and the physical object.

21. An apparatus for managing data in a distributed system implemented in a network, comprising:

a network interface that is coupled to a network for communicating one or more packet flows therewith;

one or more processors;

one or more computer-readable media; and one or more sequences of instructions carried by the computer-readable media, which, when executed by the one or more processors, cause the one or more processors to carry out the steps of:

receiving first mobile data that includes non-routing data describing a mobile node of a plurality of network nodes, each network node implemented as one of an end node configured to originate or terminate data communication via at least one network link or a network device configured to pass the data communication via the at least one network link, the first mobile data received from the mobile node, wherein the mobile node is associated with a first data item of a plurality of data items in a distributed data system on the plurality of network nodes, the non-routing data includes at least one of organizational data or spatial data describing a non-location spatial state of the mobile node, the organizational data is associated with an organizational data item in a multi-level hierarchy of organizational data items in the distributed data system, and the spatial data describing the non-location spatial state of the mobile node including at least one of a physical location, shape, size, or orientation;

establishing a non-topological relationship, based on the non-routing data, between the first data item representing the mobile node and a different second data item of the plurality of data items and representing a physical object or a different second network node of the plurality of network nodes, wherein the non-topological relationship is at least one of a spatial relationship or an organizational relationship in the multi-level hierarchy; and causing content relevant to the non-topological relationship to be communicated between the mobile node and the second network node and to the mobile node based at least in part on the non-topological relationship, the distributed system further sending to the mobile node a command to improve network communications based on at least one of moving relative to another one of the network nodes or changing a radio characteristic of the mobile node, the command generated based on the spatial relationship between the mobile node and the physical object or the different second network node represented by the second data item.

22. An apparatus as recited in claim 21, wherein:
a first physical entity is associated with the first data item; and
a second physical entity is associated with the second data item.

23. An apparatus as recited in claim 22, wherein the non-topological relationship indicates at least one of:
one of the first physical entity and the second physical entity is inside the other;
the first physical entity is a particular distance from the second physical entity; or
the first physical entity is oriented in a particular direction with respect to the second physical entity, wherein oriented indicates a direction that the first physical entity is facing.

24. An apparatus as recited in claim 22, wherein the non-topological relationship indicates that at least one of the first physical entity or the second physical entity is visible to the other.

25. An apparatus as recited in claim 22, wherein the non-topological relationship indicates that the first physical entity and the second physical entity are within communication distance for a particular type of communications.

26. An apparatus as recited in claim 22, wherein the non-topological relationship indicates that at least one of the first physical entity or the second physical entity is within a spatial volume of influence of the other.

27. An apparatus as recited in claim 22, wherein the non-topological relationship indicates that one of the first physical entity and the second physical entity belongs to an organizational component of the other.

28. An apparatus as recited in claim 21, wherein:
at least some data items of the plurality of data items are related in a spatial tree data structure in the distributed data system different from a network topology tree data structure; and
a particular pair of data items with spatial data that indicates the data items are spatially nested form a parent-child relationship in the spatial tree.

29. An apparatus as recited in claim 28, wherein:
at least some data items of the plurality of data items are related in an organizational tree data structure in the distributed data system; and
a particular pair of data items that are organizationally nested form a parent-child relationship in the organizational tree.

30. An apparatus as recited in claim 28, said step of causing content to be communicated with the mobile node further comprising causing spatial tree data that describes at least a portion of the spatial tree data structure to be communicated, wherein the portion is based on the non-topological relationship.

31. An apparatus as recited in claim 21, said step of causing content to be communicated with the mobile node further comprising sending data from the second data item to the mobile node.

32. An apparatus as recited in claim 21, said step of causing content to be communicated with the mobile node further comprising associating with the second data item data included in the first mobile data.

33. An apparatus as recited in claim 21, wherein:
a second node, different from the mobile node, is associated with the second data item; and
said step of causing content to be communicated with the mobile node further comprises causing the second node to communicate the content with the mobile node.

34. An apparatus as recited in claim 21, said step of causing content to be communicated further comprising causing content formatted according to an extensible markup language (XML) to be communicated.

35. An apparatus as recited in claim 21, said step of causing content to be communicated further comprising causing content to be communicated in a payload of a routing protocol data packet, which is designed to communicate data indicating a connection to a node of the plurality of network nodes.

36. An apparatus as recited in claim 21, said step of causing content to be communicated with the mobile node further comprising causing data to be generated by using a subscription stream to obtain data from an data item of the plurality of data items based at least in part on the non-topological relationship.

37. An apparatus as recited in claim 36, said step of causing data for the mobile node to be generated further comprising causing a really simplified syndication (RSS) stream to generate change data from a data item formatted in an extensible markup language (XML) based at least in part on the non-topological relationship.

38. An apparatus for managing data in a distributed system, comprising:
a network interface that is coupled to a network for communicating one or more packet flows therewith;
one or more processors;
one or more computer-readable media; and
one or more sequences of instructions carried by the computer-readable media, which, when executed by the one or more processors, cause the one or more processors to carry out the steps of:
receiving first mobile data that includes non-location spatial data for describing a corresponding non-location spatial attribute of a mobile node of a plurality of network nodes, the first mobile data received from the mobile node,
wherein
the mobile node is associated with a first data item of a plurality of data items in a distributed data system on the plurality of network nodes, and
the non-location spatial data describing at least one of a physical shape, size, or orientation of the mobile node;
establishing a spatial relationship between the first data item and a different second data item of the plurality of data items based on the first mobile data, the second data item associated with a physical object; and
causing communications to the mobile node of a different third data item of the plurality of data items, based at least in part on the spatial relationship established relative to the mobile node and the physical object, the third data item commanding the mobile node to improve network communications based on at least one of moving relative to another of the network nodes or changing a radio characteristic of the mobile node, the command generated based on the spatial relationship between the mobile node and the physical object.

39. A system for managing data in a distributed system implemented in a network, comprising:
- a plurality of network nodes connected by a plurality of communication links, wherein each network node includes
  - a network interface that is coupled to a communication link for communicating one or more packet flows therewith;
  - one or more processors;
  - one or more computer-readable media; and
  - one or more sequences of instructions carried by the computer-readable media;
- a plurality of data items stored on the computer readable media of the plurality of network nodes, wherein the plurality of data items includes
  - a first plurality of data items that represent the plurality of network nodes, and
  - a second plurality of data items that represent a plurality of spatial entities where the plurality of network nodes may be located;
- wherein execution of the one or more sequences of instructions by the one or more processors, cause the one or more processors to carry out the steps of:
  - receiving first mobile data that includes non-routing data describing a mobile node of the plurality of network nodes, the first mobile data received from the mobile node, wherein the non-routing data includes at least one of organizational data or spatial data describing a non-location spatial state of the mobile node, the organizational data is associated with a data item in a multi-level hierarchy of organizational data items in the distributed database, and the spatial data describing the non-location state of the mobile node including at least one of a physical location, shape, size, or orientation;
  - establishing a non-topological relationship, based on the non-routing data, between a first data item of the plurality of data items and representing the mobile node and a different second data item of the plurality of data items and representing a physical object or a different second network node of the plurality of network nodes, wherein the non-topological relationship is at least one of a spatial relationship or an organizational relationship in the multi-level hierarchy; and
  - causing content relevant to the non-topological relationship to be communicated between the mobile node and the second network node and to the mobile node based at least in part on the non-topological relationship, the distributed system further sending to the mobile node a command to improve network communications based on at least one of moving relative to another one of the network nodes or changing a radio characteristic of the mobile node, the command generated based on the spatial relationship between the mobile node and the physical object or the different second network node represented by the second data item.

40. A system as recited in claim 39, wherein the plurality of data items includes a third plurality of data items that represent organizational units of an organization that is associated with at least one of the network of mobile nodes or the plurality of spatial entities.

41. A system as recited in claim 39, wherein:
- a first data item of the plurality of data items is associated with the mobile node;
- a first physical entity is associated with the first data item; and
- a different second physical entity is associated with a different second data item of the plurality of data items.

42. A system as recited in claim 41, wherein the non-topological relationship indicates at least one of:
- one of the first physical entity and the second physical entity is inside the other;
- the first physical entity is a particular distance from the second physical entity; or the first physical entity is oriented in a particular direction with respect to the second physical entity.

43. A system as recited in claim 41, wherein the non-topological relationship indicates that at least one of the first physical entity or the second physical entity is visible to the other.

44. A system as recited in claim 41, wherein the non-topological relationship indicates that the first physical entity and the second physical entity are within communication distance for a particular type of communications.

45. A system as recited in claim 41, wherein the non-topological relationship indicates that at least one of the first physical entity or the second physical entity is within a spatial volume of influence of the other.

46. A system as recited in claim 41, wherein the non-topological relationship indicates that one of the first physical entity and the second physical entity belongs to an organizational component of the other.

47. A system as recited in claim 39, wherein:
- at least some data items of the plurality of data items are related in a spatial tree data structure in the distributed data system different from a network topology tree data structure; and
- a particular pair of data items with spatial data that indicates the data items are spatially nested form a parent-child relationship in the spatial tree.

48. A system as recited in claim 47, wherein:
- at least some data items of the plurality of data items are related in an organizational tree data structure in the distributed data system; and
- a particular pair of data items that are organizationally nested form a parent-child relationship in the organizational tree.

49. A system as recited in claim 47, said step of causing content to be communicated with the mobile node further comprising causing spatial tree data that describes at least a portion of the spatial tree data structure to be communicated, wherein the portion is based on the non-topological relationship.

50. A system as recited in claim 39, said step of causing content to be communicated with the mobile node further comprising:
- receiving second mobile data from the mobile node; and
- associating the second mobile data with the second data item.

51. A system as recited in claim 39, wherein:
- a second node, different from the mobile node, is associated with the second data item; and
- said step of causing content to be communicated with the mobile node further comprises causing the second node to communicate the content with the mobile node.

52. A system as recited in claim 39, said step of causing content to be communicated further comprising causing content formatted according to an extensible markup language (XML) to be communicated.

53. A system as recited in claim 39, said step of causing content to be communicated further comprising causing content to be communicated in a payload of a routing protocol data packet, which is designed to communicate data indicating a connection to a node of the plurality of network nodes.

54. A system as recited in claim 39, said step of causing content to be communicated with the mobile node further comprising causing data to be generated by using a subscription stream to obtain data from an data item of the plurality of data items based at least in part on the non-topological relationship.

55. A system as recited in claim 54, said step of causing data for the mobile node to be generated further comprising causing a really simplified syndication (RSS) stream to generate change data from a data item formatted in an extensible markup language (XML) based at least in part on the non-topological relationship.

* * * * *